United States Patent [19]

Smith et al.

[11] Patent Number: 4,773,335
[45] Date of Patent: Sep. 27, 1988

[54] TRAIN OF HIGHWAY TRAILERS USING IMPROVED RAILROAD TRUCK SUSPENSION

[75] Inventors: Sam D. Smith, Richton Park, Ill.; Richard D. Curtis, Munster, Ind.

[73] Assignee: Thrall Car Manufacturing Company, Chicago Heights, Ill.

[21] Appl. No.: 920,759

[22] Filed: Oct. 20, 1986

[51] Int. Cl.$^4$ ............................................. B60F 1/04
[52] U.S. Cl. ..................................... 105/4.3; 410/53; 410/56
[58] Field of Search ....................... 410/44, 45, 53, 54, 410/56; 105/3, 4.1, 4.3, 215.2

[56] References Cited

U.S. PATENT DOCUMENTS

| | | | |
|---|---|---|---|
| 2,036,535 | 4/1936 | Nelson | 105/159 |
| 2,230,090 | 1/1941 | Rabey | 105/215 |
| 2,841,094 | 7/1958 | Schumacher | 410/53 |
| 2,963,986 | 12/1960 | Dobson | 105/4 |
| 3,670,660 | 6/1972 | Weber et al. | 105/171 |
| 3,812,791 | 5/1974 | Barnard | 105/393 |
| 4,222,694 | 9/1980 | Ward | 410/45 |
| 4,574,707 | 3/1986 | Hickman | 105/3 X |
| 4,669,391 | 6/1987 | Wicks et al. | 105/4.3 |

OTHER PUBLICATIONS

European Patent Application 0143614 A2 published 5 Jun. 1985.

Primary Examiner—Robert B. Reeves
Assistant Examiner—Frank Williams
Attorney, Agent, or Firm—Marshall, O'Toole, Gerstein, Murray & Bicknell

[57] ABSTRACT

A railroad train comprising a plurality of highway trailers hitched front end to rear end with the end of each trailer supported on an adapter releasably connected to the trailer and with the adapter permanently mounted on the bolster of a four-wheel double-axle railroad truck, desirably a swing motion truck, with the adapter also supported by side bearings mounted on the bolster and with the adapter desirably having a secondary spring suspension.

42 Claims, 12 Drawing Sheets

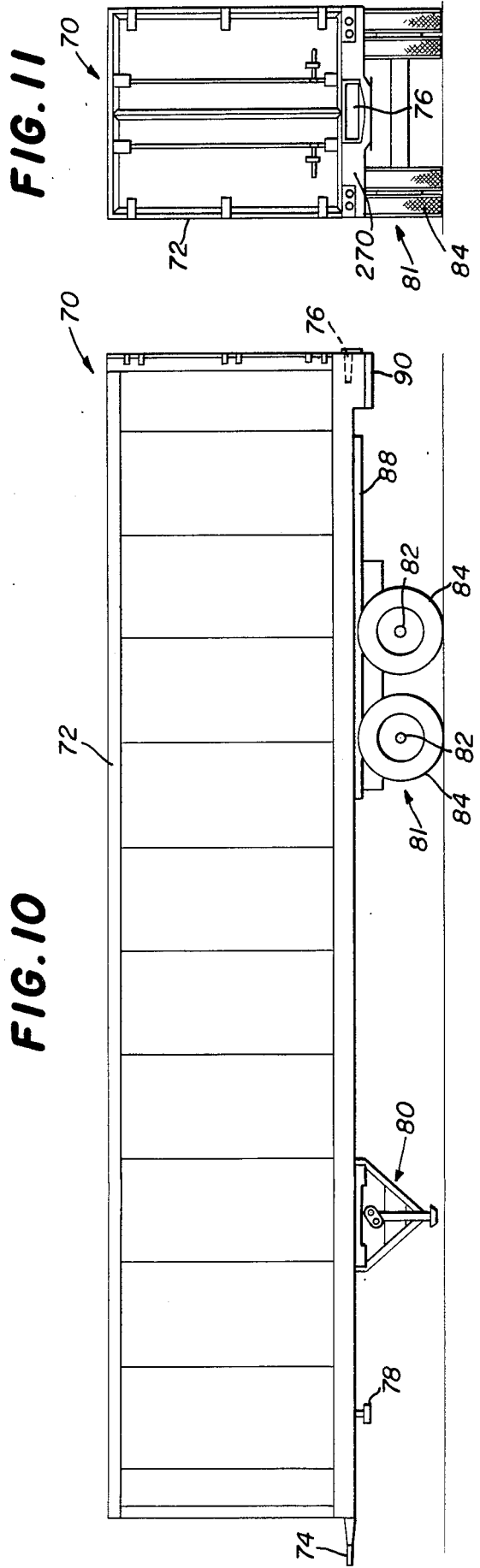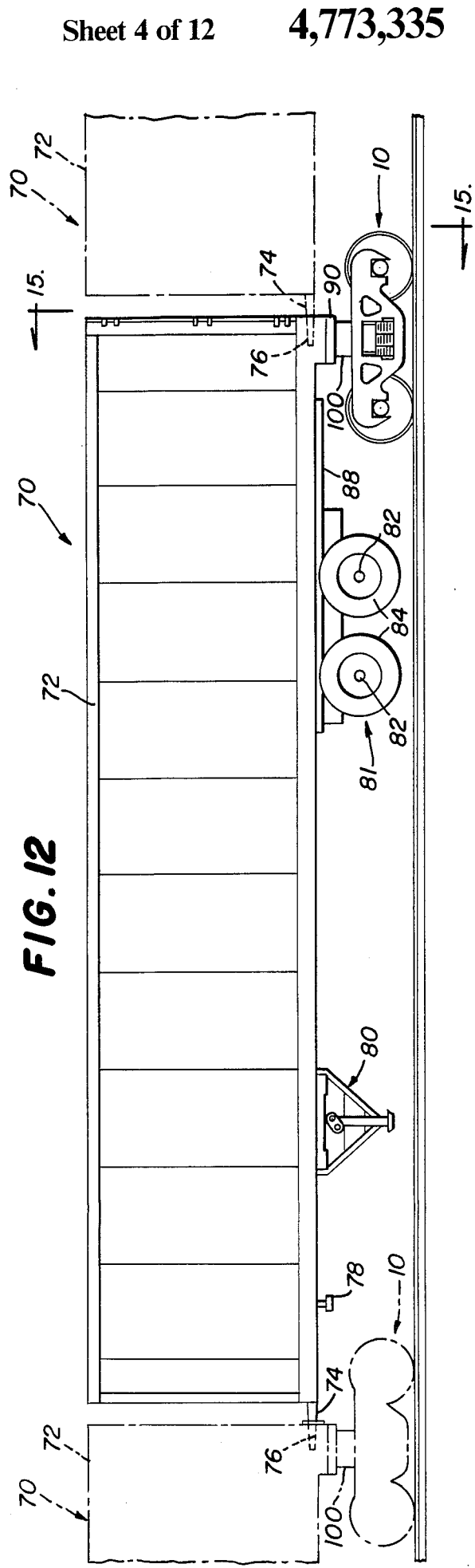

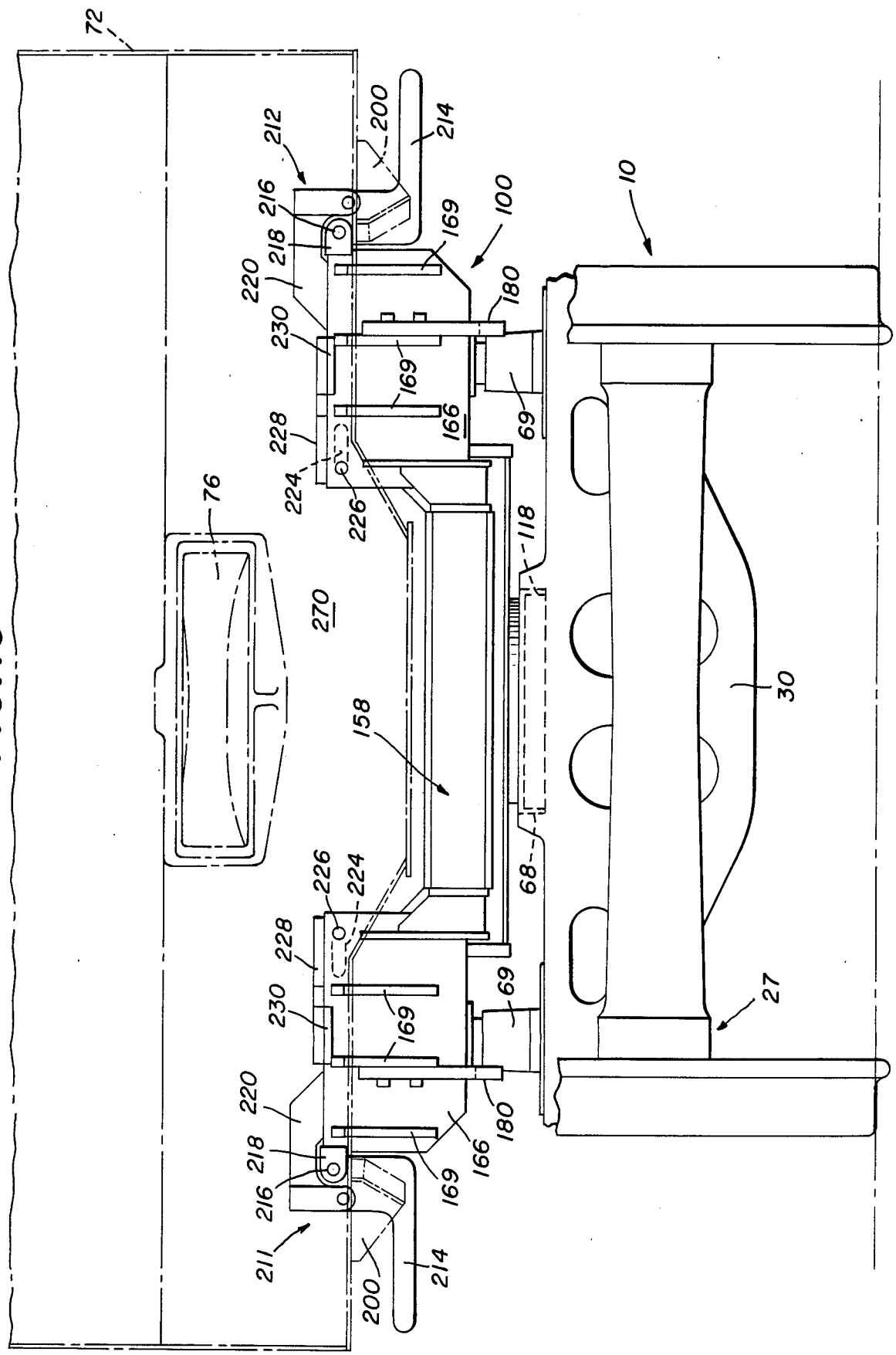

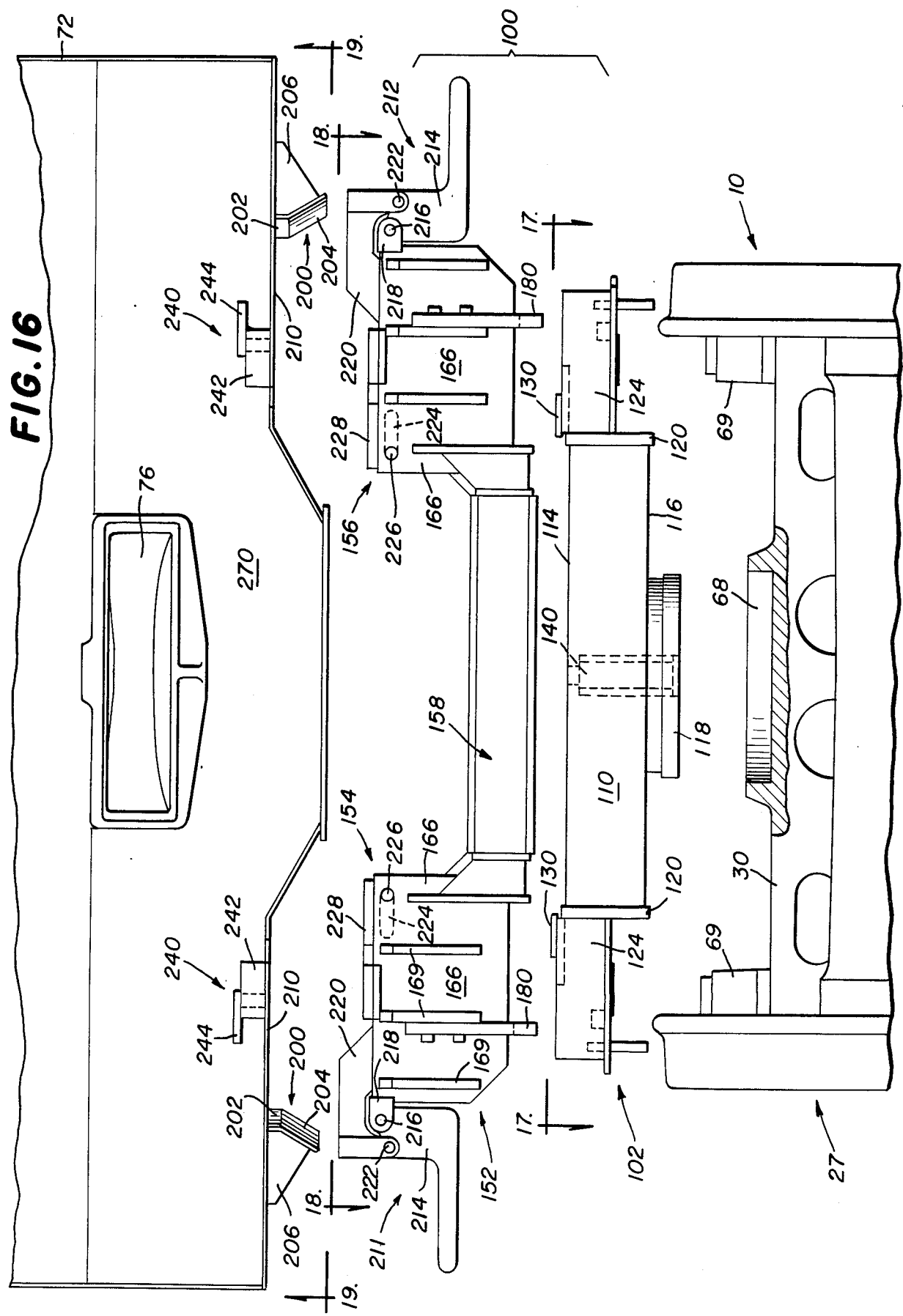

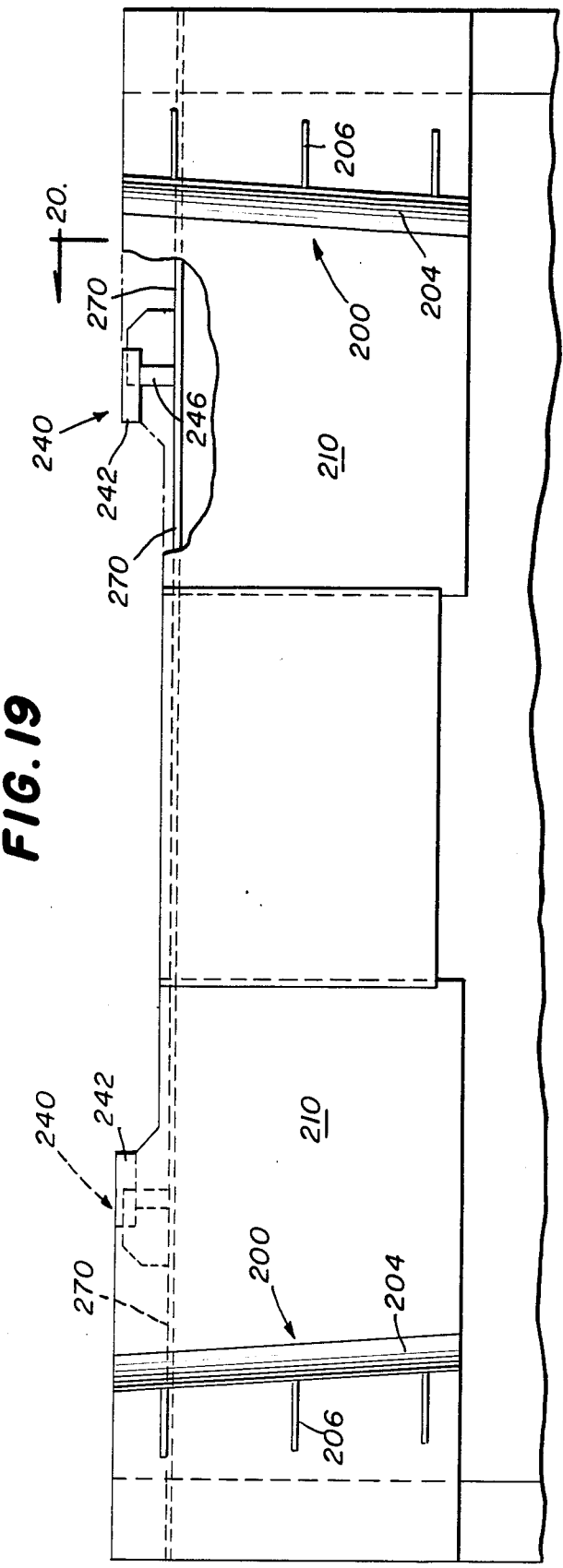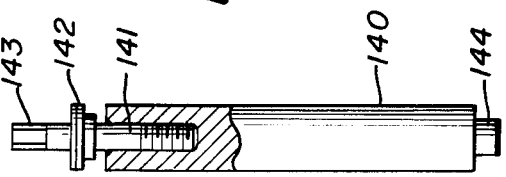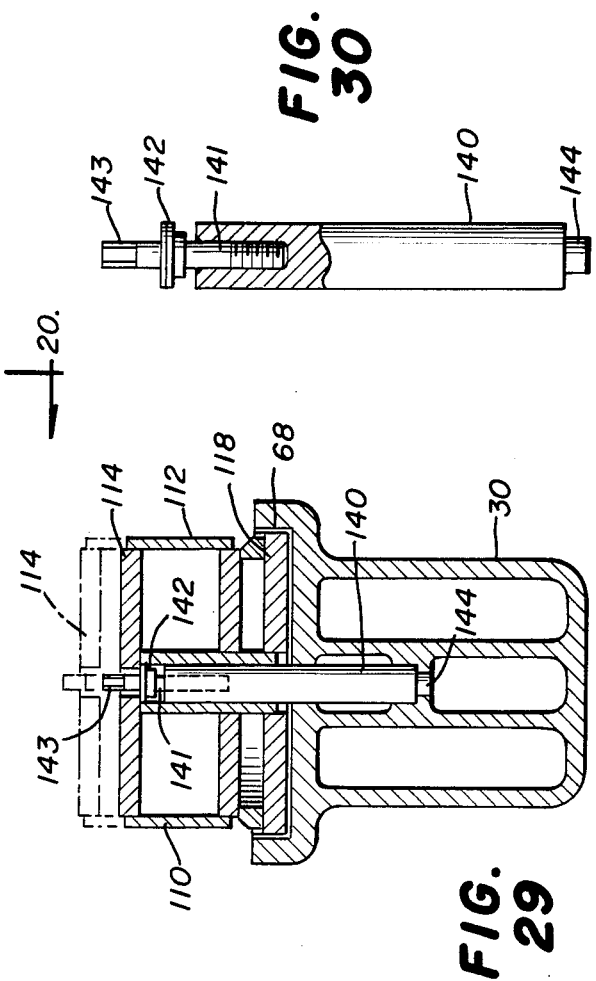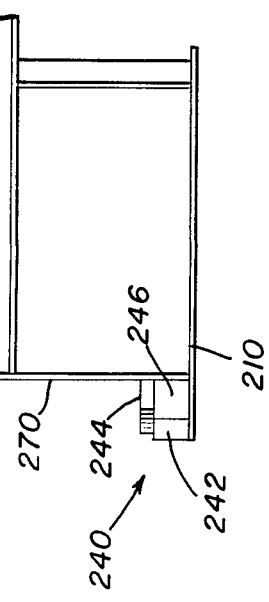

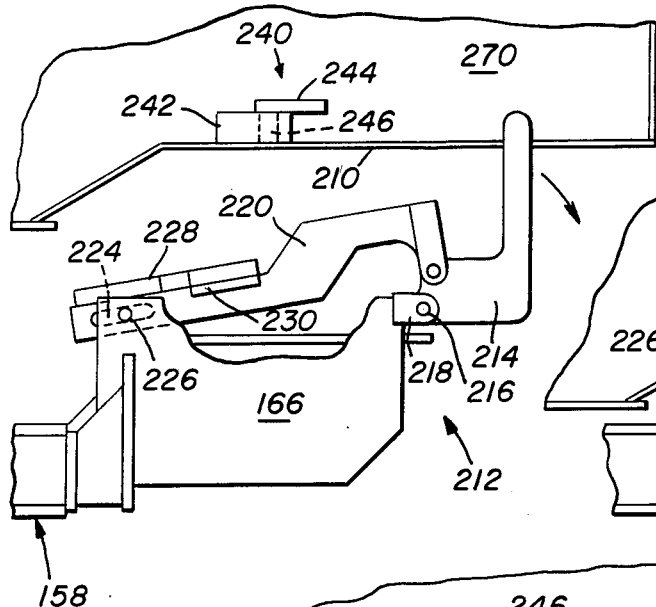
FIG. 23
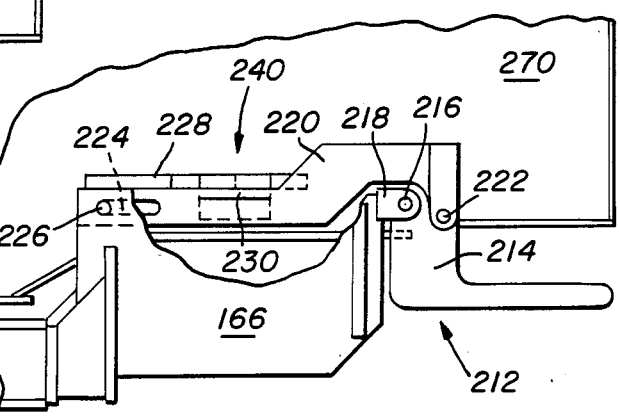
FIG. 24
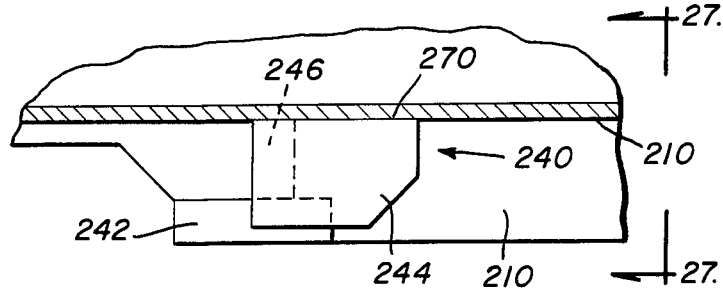
FIG. 25
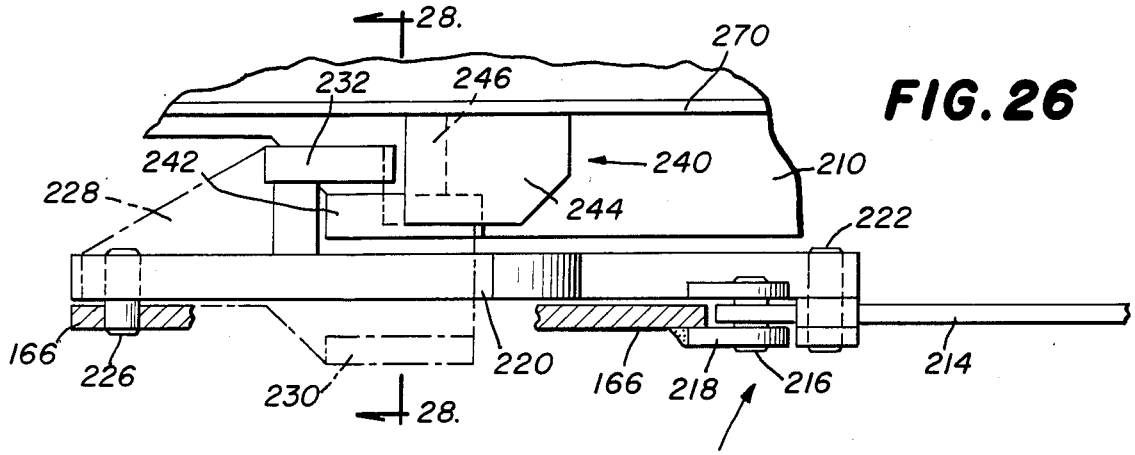
FIG. 26
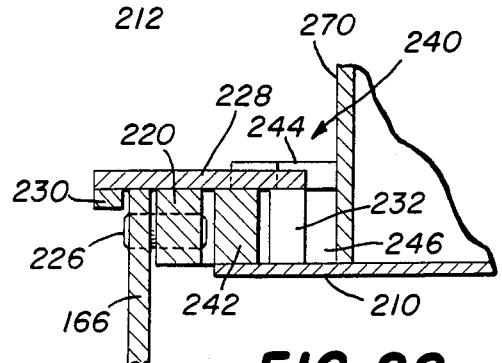
FIG. 27
FIG. 28

TRAIN OF HIGHWAY TRAILERS USING IMPROVED RAILROAD TRUCK SUSPENSION

This invention relates to railroad trains formed of over the highway trailers coupled together. More particularly, this invention is concerned with an improved train of coupled trailers which uses a railroad truck releasably connected to the end of each trailer and a unique adapter by which the truck and trailer are coupled together.

BACKGROUND OF THE INVENTION

In the United States and many other countries much goods is transported over highways in trailers, or more particularly semi-trailers. The movement of goods by highway trailer is quite efficient for short hauls because of its nearly unlimited flexibility as to origin and destination of shipments. However, long hauls between major metropolitan and manufacturing centers generally involve no advantage in flexibility but do have relatively high fuel, labor and equipment costs. To overcome these disadvantages, railroads have provided piggyback transportation in which trailers are carried on railroad flat cars. This method of shipping is rapid, relatively low cost, fuel efficient, involves no wear on the trailer and eliminates any need to unload the trailer lading between the place of origin and the destination. The railroads have recognized for some time, however, that if the flat car could be eliminated and trains formed solely by coupling the trailers together end-to-end that far less weight would have to be moved over the track. This would lower fuel consumption, lower terminal time and expense, reduce capital investment by eliminating a need for trailer carrying flat cars and would reduce railroad track wear and road bed repairs.

One system previously proposed for making a train of highway trailers is to support the back or rear end of each trailer on a railroad truck of the four-wheel two-axle type. The front end of each trailer, all of which face in the same direction, is then connected to the truck or to the back end of the adjoining forward trailer. Each railroad truck is releasably connected to the trailer it supports by means of an adapter. One train embodiment of this type is disclosed in Dobson U.S. Pat. No. 2,963,986. The adapter disclosed in the reference, however, is not considered to be structurally acceptable so that an improved adapter for the stated purpose is highly desirable.

A train of highway trailers is formed by delivering the trailers, loaded or empty, to a railroad freight yard where an inventory of dedicated and suitably adapted railroad trucks is stored on the tracks. The rear end of a trailer is then positioned above the truck, the over the highway wheels on the trailer are then lifted, as by air springs, and the trailer lowered or backed up so that means on the trailer can engage with means on the truck to releasably connect them together. Then the front end of another trailer is connected to the truck or to the rear of the other trailer. In this manner, the rear of one trailer and the front of another trailer are supported by a single truck. A plurality of trailers are coupled together as described to make a train of any desired length.

A train of trailers formed as described has characteristics which distinguish it from a conventional freight train. For example, the cars of a freight train, whether they be coal cars, box cars, flat cars, gondola cars, tank cars, auto rack cars or other types of cars, are much heavier than highway trailers. Additionally, railroad cars are conventionally supported at each end by individual railroad trucks, which in most cases are of the four-wheel two-axle type, although to a more limited extent of the two-wheel single-axle type. Also, multiunit articulated cars have been built in which the ends of adjacent units rest on and share a common truck.

Because of the structural differences, the dynamics involved in a train made of such railroad cars, and a train of highway trailers, are substantially different so that what is suitable for one train is not automatically suitable for the other. Thus, in designing for trains of trailers it has been considered necessary to strengthen the trailers so that they can withstand the rocking and twisting forces, and longitudinal train action forces, to which they are subjected in rail travel. Although the trailers have been strengthened they have substantially less strength than a conventional freight car and therefore the suspension system must be improved to insure the trailer's structural adequacy against fatigue failure.

Since the loads applied by the trailers to the trucks are lighter than the loads applied by conventional railroad cars the most widely used least expensive trucks were selected for use in trains of trailers. Trains formed of such trucks, however, have been found to provide far less than desirable performance, especially at speeds above forty-five miles per hour, because of excessive lateral instability due to truck hunting. Truck hunting causes the rolling wheels and axle assembly of a standard railway freight car truck to move along a pair of rails in a sinusoidal pattern. A need accordingly exists for a train of trailers which can travel at increased speeds with lower lateral instability due to truck hunting.

SUMMARY OF THE INVENTION

According to one aspect of the invention a railroad train is provided comprising a plurality of highway trailers positioned front end to rear end; each highway trailer having highway engaging wheels near the rear end supported above a railroad track; means on each trailer to selectively raise the highway engaging wheels to an inoperative position for travel on a railroad track and to lower the wheels into highway engaging operative position for travel on a highway; a separate railroad track engaging railroad truck positioned to releasably support the rear end of each trailer; a first coupling means substantially permanently connected to the trailer rear end; a second coupling means substantially permanently connected to the truck; means to quickly connect the first coupling means to, and quickly disconnect the first coupling means from, the second coupling means; hitch means to releasably hitch the rear end of one trailer to the front end of an adjoining trailer to form a train of a plurality of such hitched together and truck supported trailers; and the trucks supporting at least many of the trailers in the train being four-wheel two-axle swing motion trucks which control lateral roll oscillations of the truck-supported trailer and hunting of the truck.

When the first coupling means and the second coupling means are connected together the second coupling means and the truck can rotate relative to each other about a vertical axis. Desirably, this is the only rotation of the trailer relative to the truck which is possible about a vertical axis.

The hitch can include means permitting relative rotation about a horizontal axis between front and rear ends of adjoining trailers.

The truck can have a bolster having a load carrying thrust bearing; the second coupling means can be mounted on the thrust bearing; and a pin means can unite the second coupling means to the bolster so as to permit relative rotation between the second coupling means and the bolster about the pin means. Desirably, all relative rotation about a vertical axis between the trailer and supporting truck is about the pin.

An embodiment of a four-wheel two-axle swing motion truck suitable for use in a train according to the invention is disclosed in Weber, et al. U.S. Pat. No. 3,670,660, the entire contents of which is incorporated herein by reference. Such a truck permits limited swinging movement of the side frames on adapters disposed within the pedestal jaws of the side frames. A rocker seat between each side frame and a spring plank permits the side frames to swing in unison as pendulums, or swing hangers, in either direction laterally of the truck. Swinging of the side frames is stopped prior to the engagement of lateral stops provided between the bolster and spring plank by contact between a side frame tension member and the rocker seat. In this manner, increased lateral motion of the bolster relative to the side frame is obtained. This lateral motion, plus transverse deflection of the load springs, leads to improved high speed truck performance and minimizes truck hunting. While such a truck has been used on conventional railroad cars, it has not been previously used in a train of highway trailers because it is more costly and was not expected to provide an improved ride in a train of trailers because of the different dynamics involved in such a train compared to a train of conventional railroad cars.

According to a second aspect of the invention a railroad train is provided in which the second coupling means constitutes an adapter of unique construction and which can be beneficially used in combination with any railroad truck of the four-wheel double axle type having a bolster, including a swing motion truck such as described above. The adapter is mounted on, and longitudinal to, the truck lateral bolster.

The adapter can be supported by side bearings mounted on the bolster and have longitudinally spaced apart upper surfaces which contact mating surfaces on, and support, the trailer. The bolster can have a bearing recess and the adapter a bearing boss which is rotatable in the bolster bearing recess.

The adapter can include a portion above each bolster side bearing which is vertically displaceable upon application of an increased load by rocking of the trailer.

The adapter can have complementary lower and upper sections which are interconnected but vertically movable with respect to each other for a predetermined distance. Displaceable means can be located between the adapter lower and upper sections above the bolster side bearings, with said displaceable means being vertically displaceable downwardly upon application of an increased load by rocking of the trailer.

The vertical displaceable means can be a hydraulic or pneumatic means which permits the top of the adapter to be displaced downwardly when the applied load increases. The displaceable means may also be a spring of metal or other material. Thus, one or more coil springs can be used. However, a resilient compressible material in block form which functions as a spring is presently considered most suitable, especially blocks made of an elastomeric material, and especially cylindrical blocks of elastomeric material marketed by Firestone Industrial Products under the name MARSHMELLOW.

The adapter can have a pocket above each of the bolster side bearings and the vertical displaceable means or spring means can be located in the pockets.

The adapter lower and upper sections can be restricted against significant horizontal movement relative to each other. The upper section can have guide means for guiding the adapter into coupling arrangement with the first coupling means connected to the trailer rear end.

The first coupling means can include guide means on the trailer body which cooperates with the guide means on the adapter to position the adapter in coupling arrangement with the trailer bottom and the adapter and trailer can include locking means for releasably locking the adapter to the trailer.

BRIEF DESCRIPTION OF THE DRAWINGS

FIG. 10 is a diagrammatic side elevational view of an over-the-highway trailer shown ready to be coupled to a tractor for highway mode transportation, side trailer having coupling means beneath the rear bottom end for coupling it to an adapter on a railroad car truck according to the invention;

FIG. 11 is a rear elevational view of the trailer shown in FIG. 10;

FIG. 12 is a side elevational view of the trailer shown in FIGS. 10 and 11 connected end-to-end to form a train with the trailer highway running gear raised and the rear end of each trailer supported by a railroad truck;

FIG. 15 is an elevational view of the end of a trailer connected to a railroad truck taken along the line 15—15 of FIG. 12;

FIG. 16 is similar to FIG. 15 but shows the truck, adapter sections and trailer in exploded view;

FIG. 19 is a view of the bottom of the rear end of the trailer taken along the line 19—19 of FIG. 16;

FIG. 20 is a sectional view taken along the line 20—20 of FIG. 19;

FIG. 23 is a side elevational exploded view of the locking mechanism, for locking the adapter to the trailer, in unlocked position;

FIG. 24 is a side elevational view of the locking mechanism shown in FIG. 23 in locked position;

FIG. 25 is a plan view of that part of the locking mechanism located on the vertical rear end of the trailer;

FIG. 26 is a plan view of the locking mechanism as shown in FIG. 24;

FIG. 27 is a sectional view taken along the line 27—27 of FIG. 25 and shows that part of the locking mechanism on the end of the trailer in side elevation;

FIG. 28 is a sectional view taken along the line 28—28 of FIG. 26;

FIG. 29 is a sectional view taken along the line 29—29 of FIG. 18;

FIG. 30 is an enlarged view of the vertical pin, about which the bolster and adapter can rotate relative to each other, showing the screw mechanism for raising and lowering the adapter;

DETAILED DESCRIPTION OF THE DRAWINGS

THE TRUCK

Figure 1:
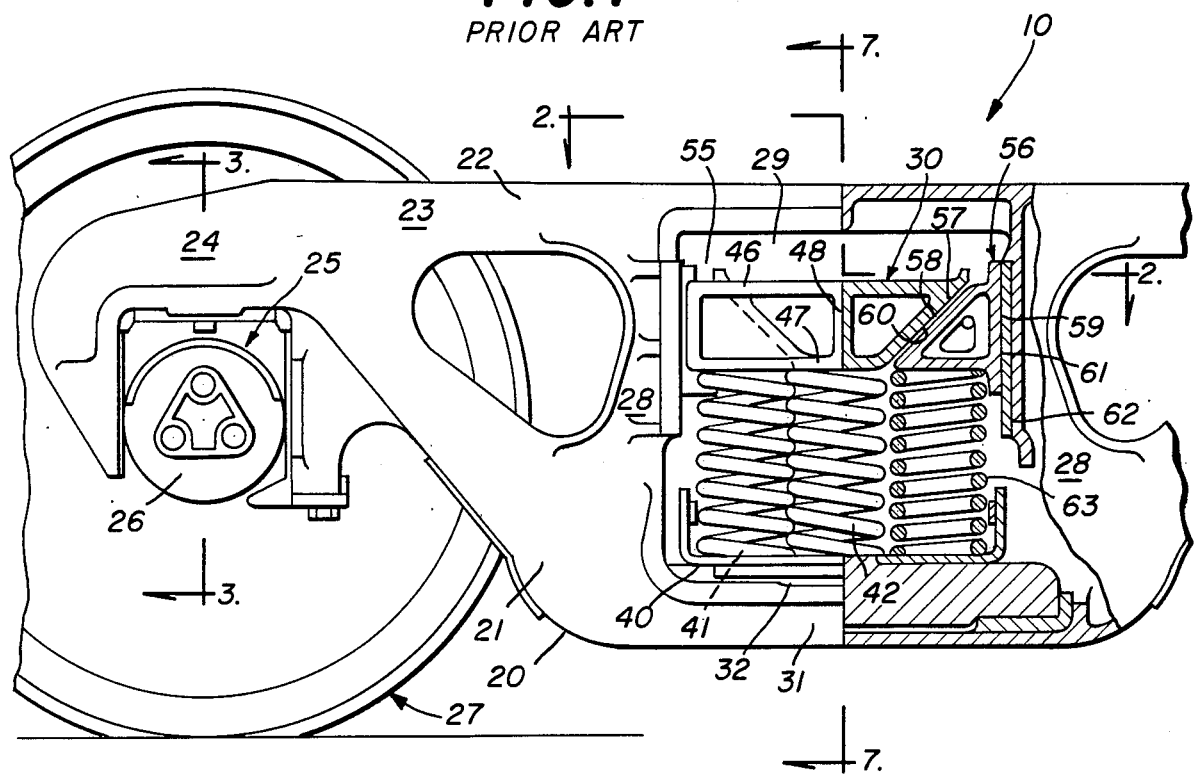
FIG. 1 is a side elevation, partly in section, of a prior art swing motion railway car truck.

FIGS. 1 through 9 of the drawings illustrate a prior art swing motion railroad truck. The railroad-car truck 10 has a side frame 20 having a tension member 21 and a compression member 22. The members merge as at 23 and provide a pedestal jaw 24 for receiving in rockable relation an adapter 25 and bearing assembly 26 of a journaled wheel and axle assembly 27. A plate member 18 is interposed between jaw 24 and adapter 25. The top side of the adapter 25 is convexly crowned as at 25a and is engaged by the convexly curved undersurface 18a of member 18 to permit swinging movement of the side frame relative to the adapter and the wheel and axle assembly. Intermediate the lengthwise direction of the frame, there is positioned a pair of spaced vertical columns 28—28. The columns connect the tension and compression members to form and partially define a bolster receiving opening 29. Opening 29 receives one end of bolster 30 arranged with its longitudinal axis transverse to the length of the frame. It will be understood that while only one side frame has been shown in the drawings, there is a similar frame on the other side of the car truck which cooperates with the bolster and other parts of the truck in like manner.

Tension member 21 includes a U-shaped base portion 31 for partially housing a rocker seat 32. The rocker seat comprises an elongated plate section 33 and a depending inverted T-shaped strengthening member 34. Each end of the rocker seat has a trunnion member 35 for rockably supporting the rocker seat relative to the side frame. Trunnion members 35—35 are pivotally supported in a pair of longitudinally spaced-apart rocker bearings 36 which are disposed beneath columns 28 and are coaxially aligned in base portion 31 of tension member 21. Each rocker bearing 36 has a concave cylindrical bearing surface 37 having a radius of curvature greater than that of the associated trunnion member 35 pivotally received therein to assure that rocking engagement occurs between the trunnion member and bearing. Rocker seat 32 provides a top surface 38 for supporting a channel shaped end of a spring plank 40 arranged with its longitudinal axis transverse to the length of the frame. Plank 40 is interconnected to rocker seat 32 by upstanding bosses 41 formed on the seat and extending through openings in the plank to interlock the two side frames together. A spring group 42 is disposed between spring plank 40 and bolster 30 for resiliently supporting the end of the bolster.

Figure 2:
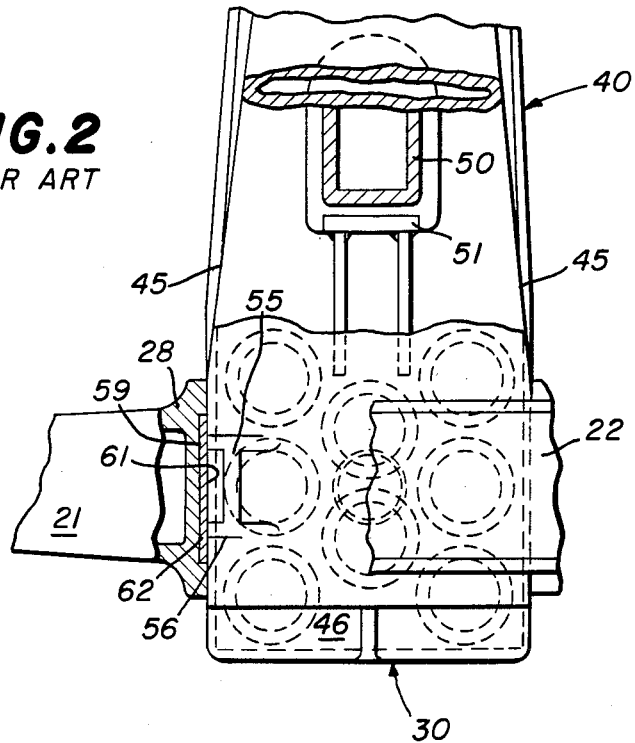
FIG. 2 is a vertical sectional view taken along line 2—2 of FIG. 1, looking in the direction of the arrows with the bearing assembly removed.
Figure 3:
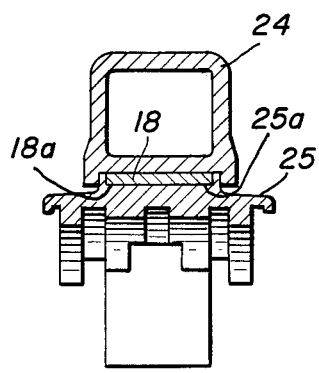
FIG. 3 is a fragmentary plan view, partly in section, taken along the line 3—3 of FIG. 1.
Figure 6:
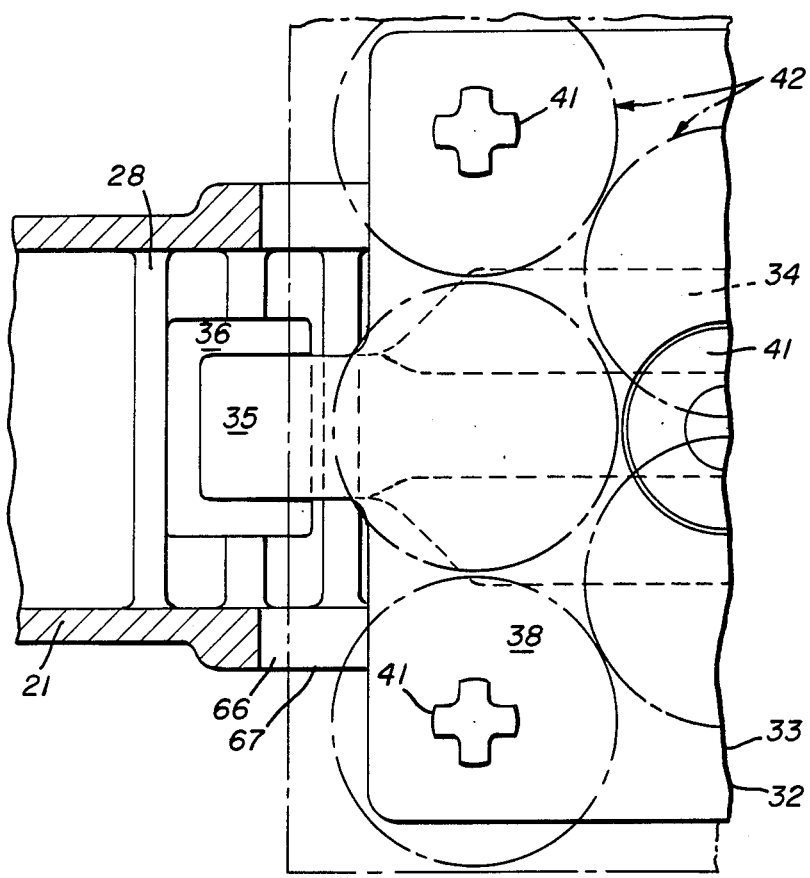
FIG. 6 is a fragmentary plan view taken along the line 6—6 of FIG. 4.
Figure 5:
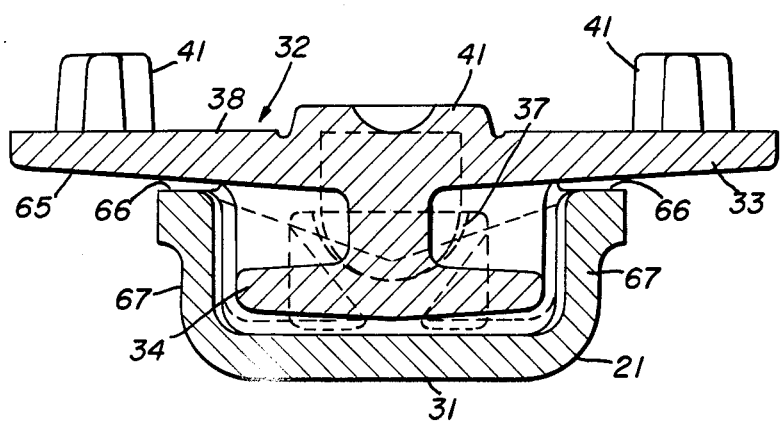
FIG. 5 is a fragmentary end view taken along the line 5—5 of FIG. 4.
Figure 4:
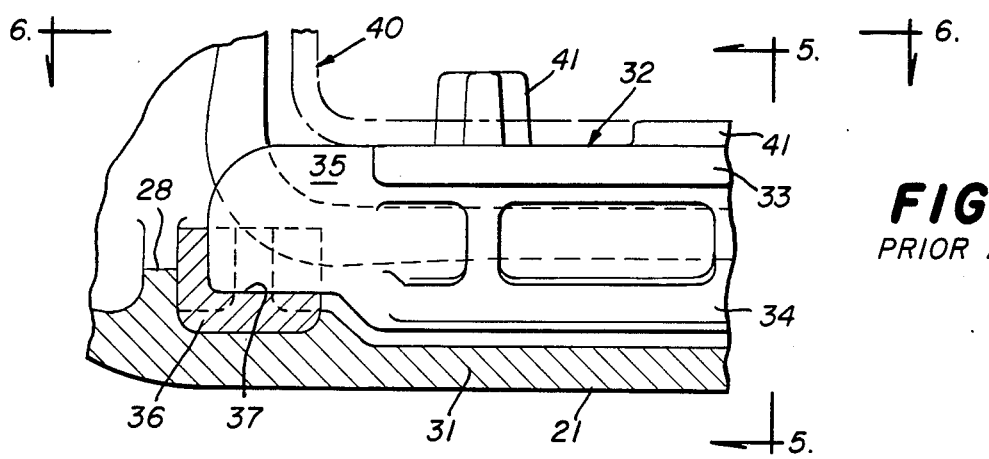
FIG. 4 is an enlarged fragmentary side elevation, partly in section, illustrating one end of a pivotally supported rocker seat.

The bolster illustrated in FIGS. 1 and 2 is generally of box-shaped construction at each end and comprises spaced vertical side walls 45—45, spaced top and bottom walls 46 and 47 respectively, and a vertical central wall 48 joining the top and bottom walls. A stop lug 50 depends from the bottom wall of the bolster inwardly from each of its ends and is in spaced relation with an upstanding abutment 51 carried by spring plank 40 intermediate its ends. Lug 50 and abutment 51 are spaced apart a predetermined distance so as to provide a clearance between opposing vertical surfaces thereon preferably on the order of approximately five-eighths of an inch, which clearance permits limited lateral movement of the bolster transversely of the truck. It will be seen that the engagement between each lug and abutment will occur at a level substantially below the horizontal plane containing the rockable connection defined by the adapter 25 and pedestal jaw 24, which connection may be of the type disclosed in either U.S. Pat. Nos. 2,717,588 or 2,737,907. This form of a connection normally allows the side frames of the truck to swing transversely of the truck.

For snubbing the sprung mass of the railway car truck, each end portion of the bolster has at each side a pocket 55 opening towards the adjacent column 28 for receiving a friction shoe 56. Each pocket has an inclined rear wall 57 which slopes upwardly and outwardly toward the adjacent column 28. Each friction shoe is in wedging engagement between wall 57 and the opposing column 28. Each shoe has a sloping surface 58 engaging surface 60 on wall 57 and a vertical friction surface 59 engaging surface 61 on a wear plate 62 that is secured to the adjacent column. In operation the friction shoe is urged upwardly and outwardly by a spring 63 disposed on plank 40 into frictional engagement with surface 61 of the wear plate to provide resistance to both vertical and lateral movements of the bolster.

Figure 7:
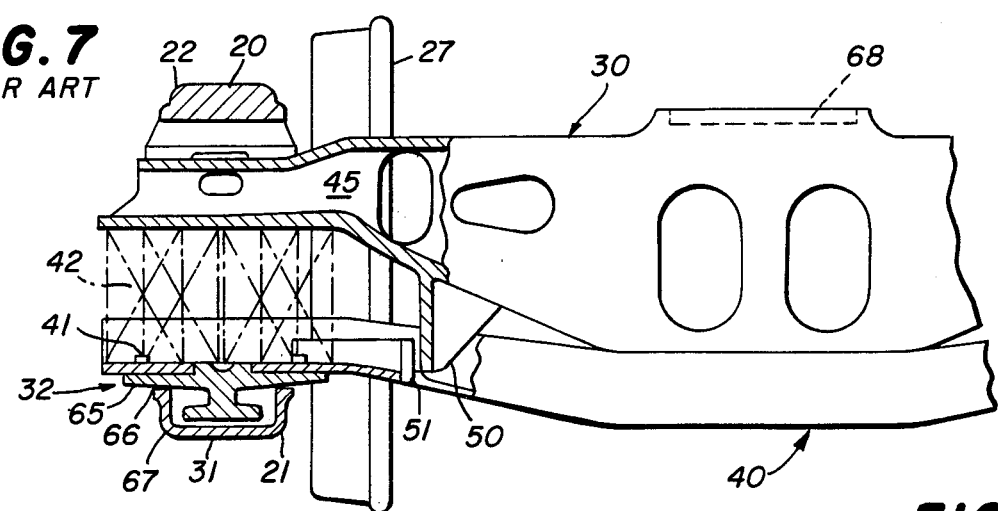
FIG. 7 is a fragmentary end view, partially in section, taken along the line 7—7 of FIG. 1.

The structural arrangement of the truck parts permits the side frames to swing laterally in unison. Swinging of the side frames in either direction is stopped by contact between undersurface 65 of the rocker plate section 33 and top surface 66 of one of the side walls 67—67 of base portion 31 of the tension member. The clearance between these engaging surfaces permits approximately a 3 degree side frame swing in either transverse direction of the side frame from its neutral position as shown in FIG. 7. This swinging movement results in approximately five-eighths inch lateral motion of the bolster in either direction. An additional five-eighths inch lateral motion of the bolster is obtained by the lateral deflection of the load spring. The empty and loaded car characteristics are different because the resistance to lateral motion is dependent upon the load carried by the bolster. Thus, the resistance to lateral motion varies in proportion to the vertical load, and any partial load will result in a response between an empty and fully loaded car.

Figure 8:
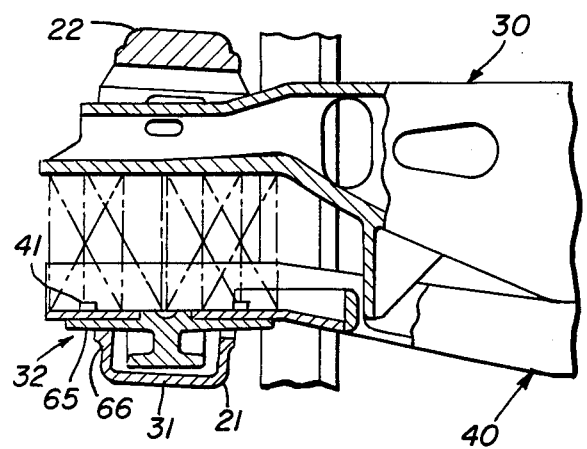
FIGS. 8 and 9 are views similar to FIG. 7, illustrating lateral motion of the truck during the first and second stages of lateral truck displacement.
Figure 9:
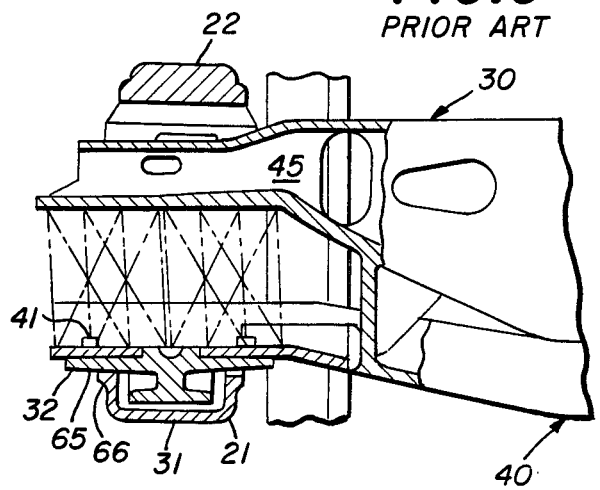

During the first stage of lateral movement, as illustrated in FIG. 8, the resistance against side frame swing is influenced basically by three controlling factors (1) the swing hanger length; that is, the vertical distance between the engaging portions of the pedestal jaw 24-adapter 25 and the rocker bearing 36-trunnion 35, (2) the normal forces of gravity acting upon the car body and side frames 20, and (3) the resistance to lateral distortion of the load spring group 42. These controlling factors work together and in series to provide low resistance. After the swinging of the side frame has been stopped by the engagement of rocker seat 32 with tension member 21, the remaining lateral motion of the bolster is obtained by the deflection of the load springs 42 resulting in the second stage or high resistance (FIG. 9).

Under the theory of vibrations it is known that when a lateral load is applied to a pendulum, the lateral displacement of the pendulum is in proportion to the applied load. This characteristic is similar to that of a spring in tension or compression since when a vertical load is applied to a spring, its deflection is in proportion to the applied load. Therefore, a theoretical spring rate for a spring can be substituted for the lateral force-displacement characteristic of a pendulum. That is, since the side frame functions as a swing hanger or pendulum and moves in the same lateral direction as the laterally distorted load springs 42, the lateral swinging movement of the side frame has an effective spring rate. Further, a helical spring has a lateral force-travel characteristic in addition to its vertical force-travel characteristic. Therefore, the lateral deflection of the load springs 42 and the lateral deflection of the swing hanger can be considered as two springs acting in series. It is well known that when two springs act in series, the resulting spring rate K is lower than that for either of the two springs individually. Thus the low resistance are basically governed by the formula $K_c = (K_1 K_2)/(K_1 + K_2)$ where $K_1$ in this instance is the effective spring rate of the swinging side frame, $K_2$ is the lateral spring rate of the load springs 42, and $K_c$ is the resulting spring rate that defines the resistance to lateral movement of the bolster relative to the side frame. After a predetermined amount of side frame swinging, the swinging is stopped and any remaining lateral travel of the bolster relative to the side frame is working solely against the lateral resistance of the load springs 42 which, as previously stated, have a spring rate appreciably stiffer than the first stage.

The railway car truck provides a moderate total amount of lateral movement approximately equal to 1¼ inches to either side of the railway track centerline. The truck further combines: (1) the feature of a low resistance to normal lateral movement of the bolster relative to the side frame for avoiding uncontrolled hunting, with (2) the feature of a stiffer resistance to any excessive lateral movement of the bolster for avoiding heavy lateral contact between the bolster stops and associated parts of the side frame.

THE TRAIN OF TRAILERS

As shown in FIGS. 10 to 12, the trailer 70 includes a body 72 of conventional over-the-highway semitrailer dimensions, which could be 48 ft. long. The body 72 has a male coupling member 74 at its front end and a female coupling member 76 at its rear end to receive the male member of an adjacent body as shown in FIG. 12 to form a train for railroad mode of transportation. Browne et al U.S. Pat. No. 4,202,454, the entire contents of which is incorporated herein by reference, discloses such a coupling means in great detail.

Each trailer 70 includes a conventional kingpin 78 adjacent its front end for removable coupling to the fifth wheel of a tractor for highway transportation, conventionally placed telescoping trailer landing gear 80 and highway running gear 81 including tandem axles 82 (although a single or triple axle suspension could also be used) with each axle mounting rubber tired wheels 84. The running gear 81 is slidably mounted to members 88 on the underframe 86 of the body 72 towards the rear thereof. The running gear 81 employs air spring suspension means which raises and lowers it. The bottom of the rear end of the trailer is provided with first coupling means 90 which is made an integral and permanent part of the trailer body. The first coupling means 90 is capable of detachably coupling with a second coupling means 100 permanently connected to the truck 10 already described. The arrangement is such that by appropriate operation of pneumatic means, the air springs suspending the highway wheels may be inflated to lower the highway wheels 84 into engagement with the ground so that the highway running gear 81 supports the trailer during highway operation. With the landing gear 80 in load supporting position (FIG. 10) a conventional tractor is coupled to kingpin 78, the landing gear 80 is then telescoped to a raised position and the vehicle is then ready for over-the-highway transportation.

Railroad operation is attained by backing the trailer (the trailer being in the highway mode of operation just described) adjacent to and in proper alignment with a railroad truck which is in proper engagement with railroad tracks. The arrangement is such that by appropriate operation of pneumatic means, the air springs suspending the highway wheels may be temporarily over-inflated, thus raising the trailer body slightly above normal ride height, the trailer then being backed onto and into engagement with the second coupling means 100 on the truck 10. Further operation of said pneumatic means is then used to exhaust the air springs suspending the highway wheels, said wheels being retracted into their stored and raised inoperative position (FIG. 10) so that the weight of the rear end of the trailer body is supported by the railroad truck. Then the front end of a following trailer is hitched to the rear end of a trailer supported by the truck. By repeating these operations a train is assembled.

Releasable locking means subsequently described herein locks and secures the second coupling means on the railroad truck to first coupling means on the trailer body and, in this latter railroad mode, the trailer may be coupled end-to-end with similar trailers as already described to form a train to be pulled by a suitable locomotive.

Transfer of the trailer from the railroad mode to the highway mode of operation is the reverse of the process just described. A highway tractor is first coupled to kingpin 78 and then the railroad truck is unlocked from the trailer body. Pneumatic means is operated to temporarily over-inflate the air springs suspending the highway wheels, the highway wheels thus lowering into engagement with the ground and raising the trailer body slightly above normal ride height, thereby disengaging the trailer from the railroad truck. The trailer may then be pulled forward and driven as a tractor-trailer combination.

Figure 13:
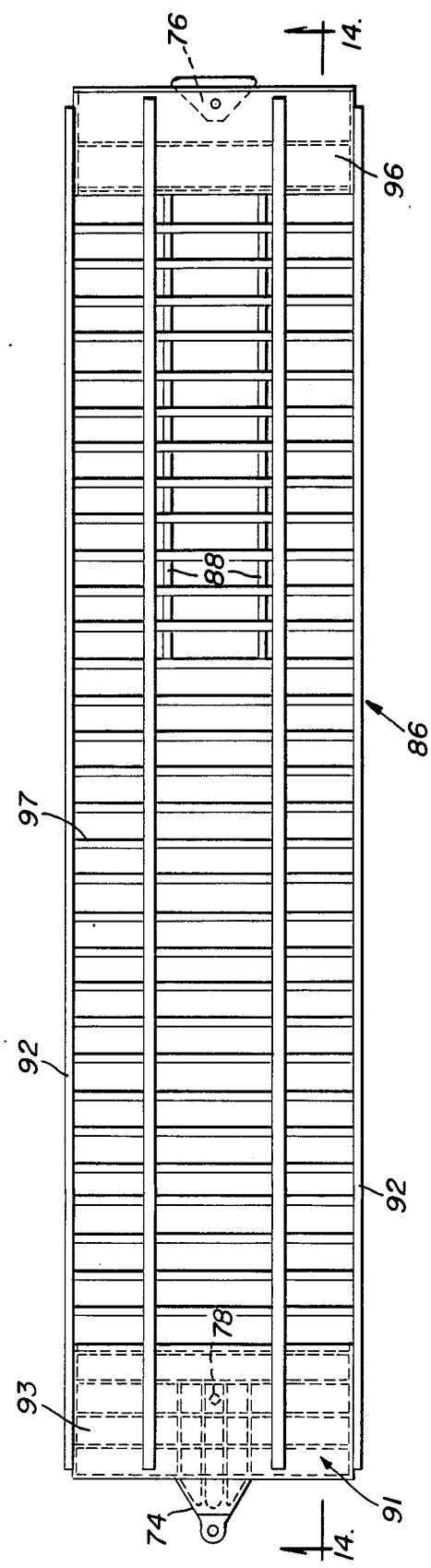
FIG. 13 is a plan view of the trailer underframe construction shown with the floorboards omitted for clarity.
Figure 14:
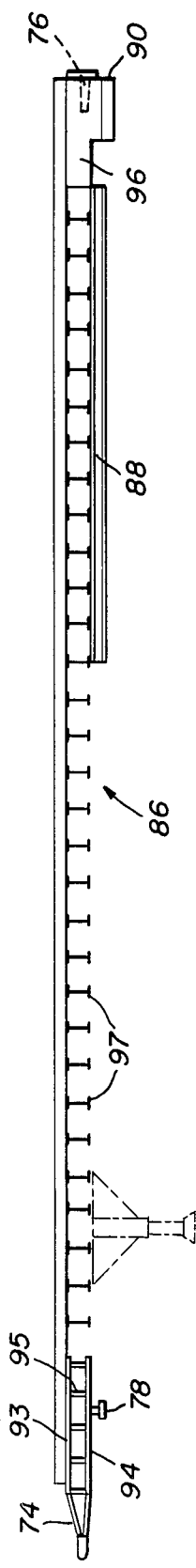
FIG. 14 is a longitudinal sectional view of the trailer taken along the line 14—14 of FIG. 13.

Referring to FIGS. 13 and 14, the trailer adjacent its front end is provided with a conventional semi-trailer kingpin subframe 91 which runs the full width of the trailer and is secured between the body side rails 92, and which extends back into the trailer and in one typical arrangement is composed of upper and lower plates 93 and 94, joined by cross webs 95 forming, in effect, a box beam, the male coupling member 74 for railroad operations being integrally joined to the kingpin subframe structure. At the rear end of the trailer is a rear underframe structure 96 which runs the full width of the trailer.

Between the rear end of the kingpin subframe 91 and the front end of the rear underframe 96 a number of I-beam crossmembers 97 are provided, secured at their ends to the body side rails 92, to some of which are secured the running gear guide beams 88. Running lengthwise of the trailer on crossmembers 97 are floorboards (not shown), preferably of laminated hardwood, which along their abutting edges are milled into ship lap or other suitable joints.

The structure heretofore described is capable of transmitting buff and draft forces of a high order of magnitude through the trailer, particularly when the trailers are coupled and running in the railroad mode as shown in FIG. 12 yet it eliminates the need for a heavy center sill structure which is common railroad practice. The forces seen by the trailer are higher than that of a trailer in conventional highway service, however, the forces are less than that seen by a freight car due to the elimination of slack in the train.

THE FIRST COUPLING MEANS AND THE SECOND COUPLING MEANS OR ADAPTER

Regardless of the particular railroad truck used in producing a train of trailers, coupling means is required to detachably or releasably connect the truck to the rear end of each trailer. The coupling means according to the invention includes a permanent first coupling means on the trailer bottom and a permanent second coupling means on the truck which couples with the first coupling means. To minimize the weight carried by the trailer during highway transportation, the first coupling means is designed to be as light-weight as possible. Accordingly, the greatest amount of weight required for a suitable coupling means is included in the second coupling means permanently mounted on the truck. It is to be understood, however, that the second coupling means is not to weigh any more than necessary to perform its function.

FIGS. 15 to 21 illustrate a first coupling means on the trailer body 10 rear end bottom and a second coupling means 100 mounted on truck 10. For convenience the second coupling means 100 will be first described in detail followed by a description of the first coupling means.

The second coupling means 100 in the form illustrated by FIGS. 15 to 21 comprises an adapter by which the truck 10 is coupled to the trailer. The adapter is accordingly assigned the same number 100 as the second coupling means.

The adapter or second coupling means 100 has a lower section 102 and an upper section 152 (FIGS. 15 and 16) which are generally horizontally arranged and positioned longitudinal of bolster 30. Bolster 30 has a centrally located center plate bowl 68 and a pair of conventionally positioned side bearings 69.

The adapter lower section 102 (FIGS. 16 and 17) has a central portion 104 and two end portions 106,108, which are mirror images of each other, mounted on the respective ends of the central portion. The central portion 104 has opposing vertical side plates 110,112, top plate 114 and bottom plate 116 having a bearing boss 118 joined to it. Bearing boss 118 fits in bolster center plate bowl 68 so that they can rotate about a common vertical axis as the train moves on a railroad track.

Figure 17:
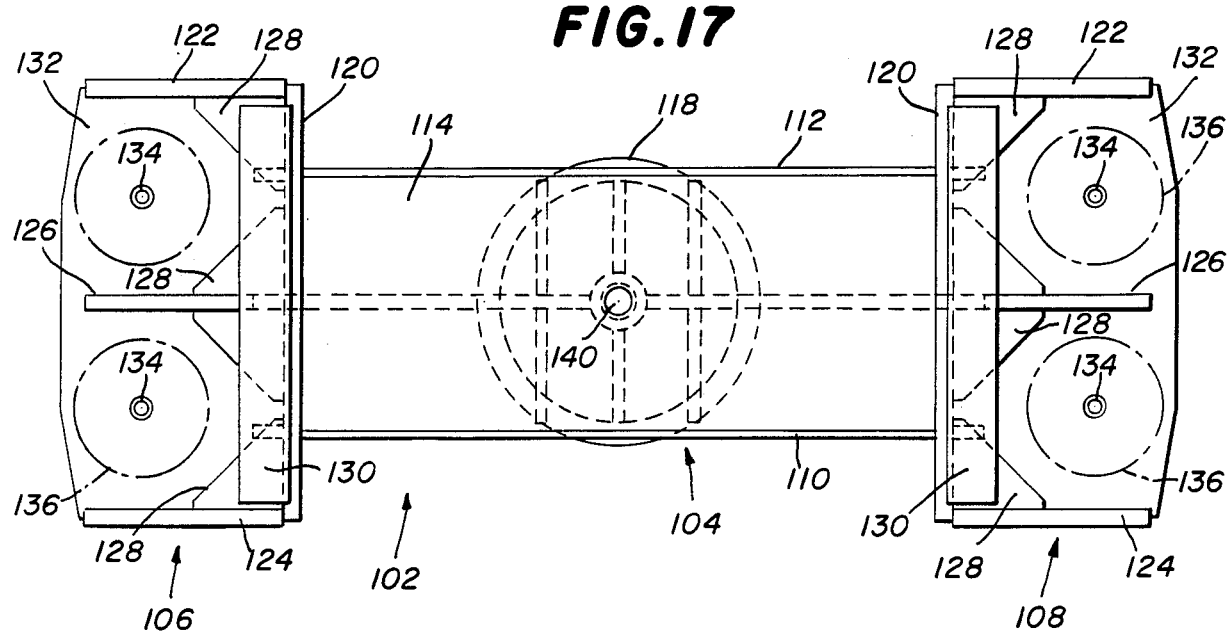
FIG. 17 is a plan view of the lower section of the adapter taken along the line 17—17 of FIG. 16.
Figure 21:
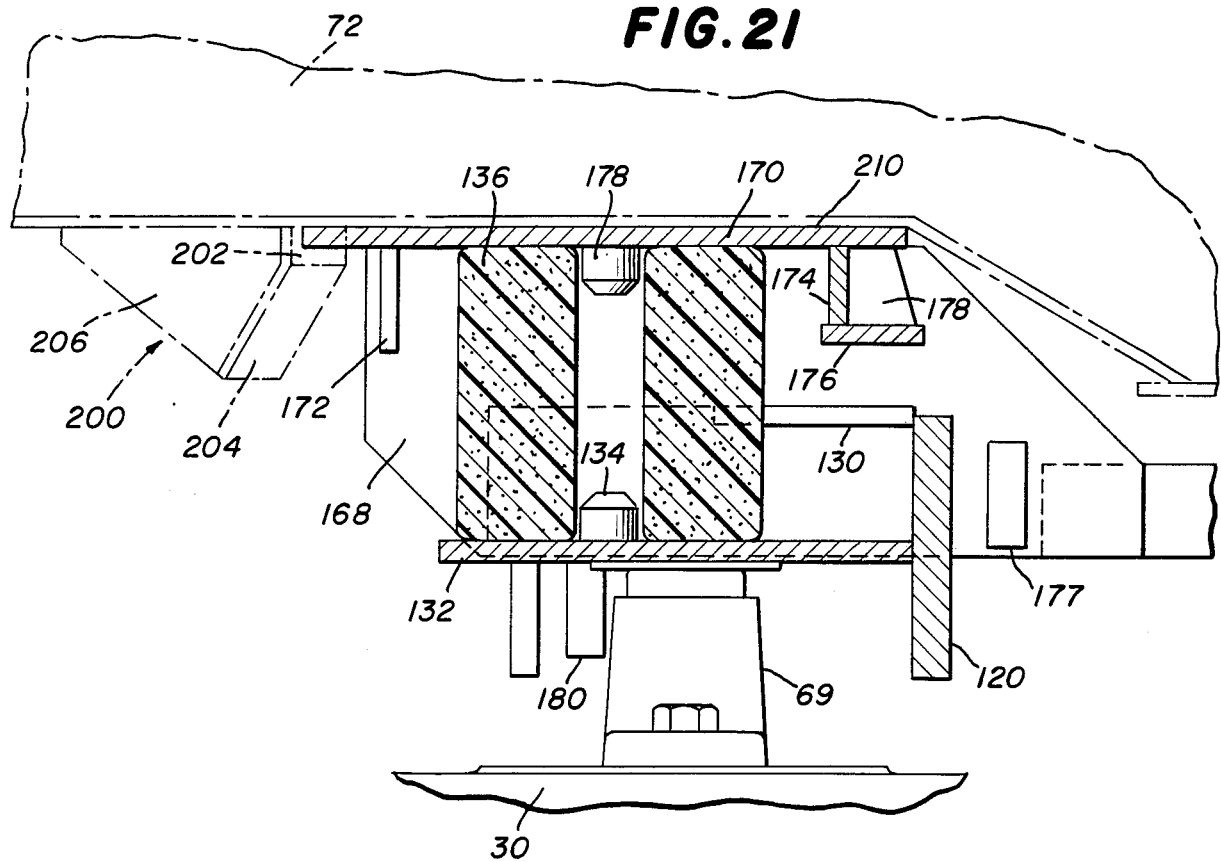
FIG. 21 is a sectional view taken along the line 21—21 of FIG. 18.
Figure 22:
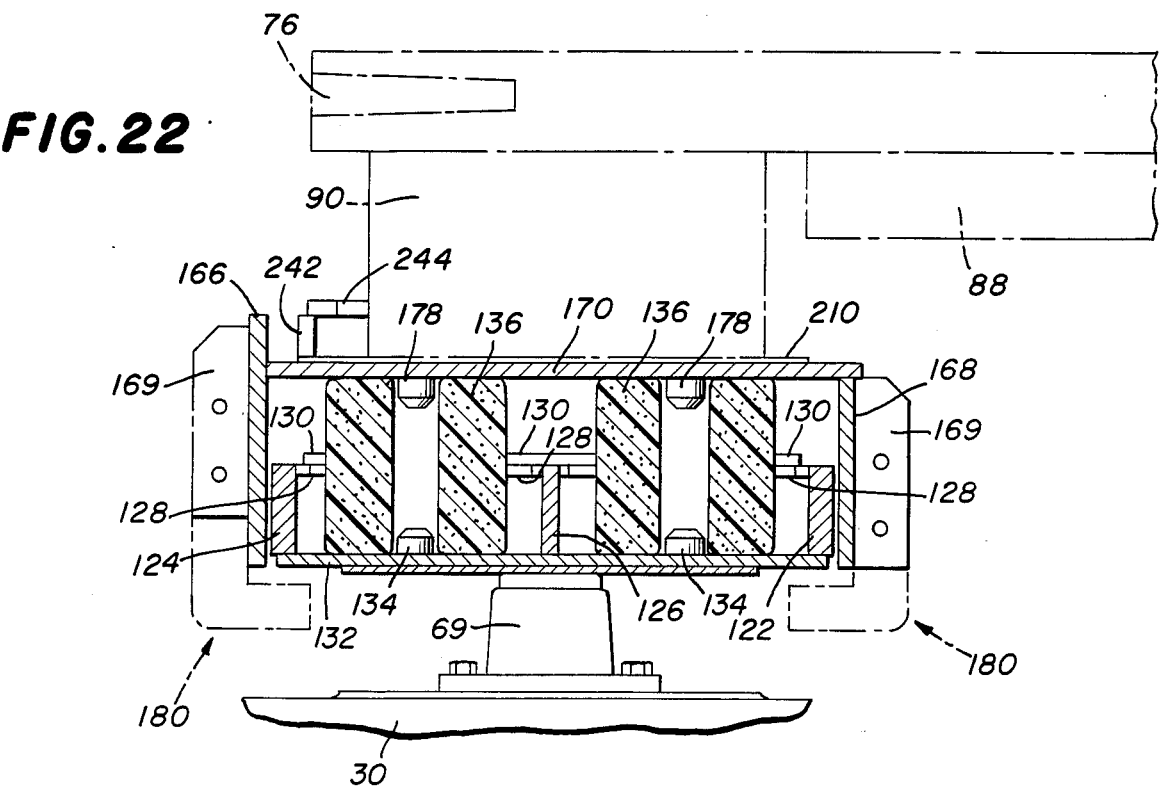
FIG. 22 is a sectional view taken along the line 22—22 of FIG. 18.

The end portions 106,108 each have an end wall 120 connected to an end of central portion 104, a pair of side walls 122,124 and a vertical central bracing plate 126. Horizontally positioned triangular gussets 128 reinforce walls 120,122,124 and plate 126. Mounted on top of each end wall 120 is a long horizontal spring stop plate 130. A bottom plate 132 is joined to the bottom edges of walls 120,122,124 and plate 126. A pair of spaced apart upwardly projecting stub pins 134 is attached to the top surface of each bottom plate 132. The adapter includes a secondary suspension comprising a pair of cylindrical elastomeric members 136 having a vertical axial hole is mounted in each end portion 106,108 with a stub pin 134 extending into the lower end of each hole to thereby keep the member 136 from sliding horizontally (FIGS. 17, 20 and 21). The elastomeric members 136 function as springs in that they are compressed when a load is applied to the upper section 152 of the adapter 100, as will be more fully explained hereinafter.

Figure 18:
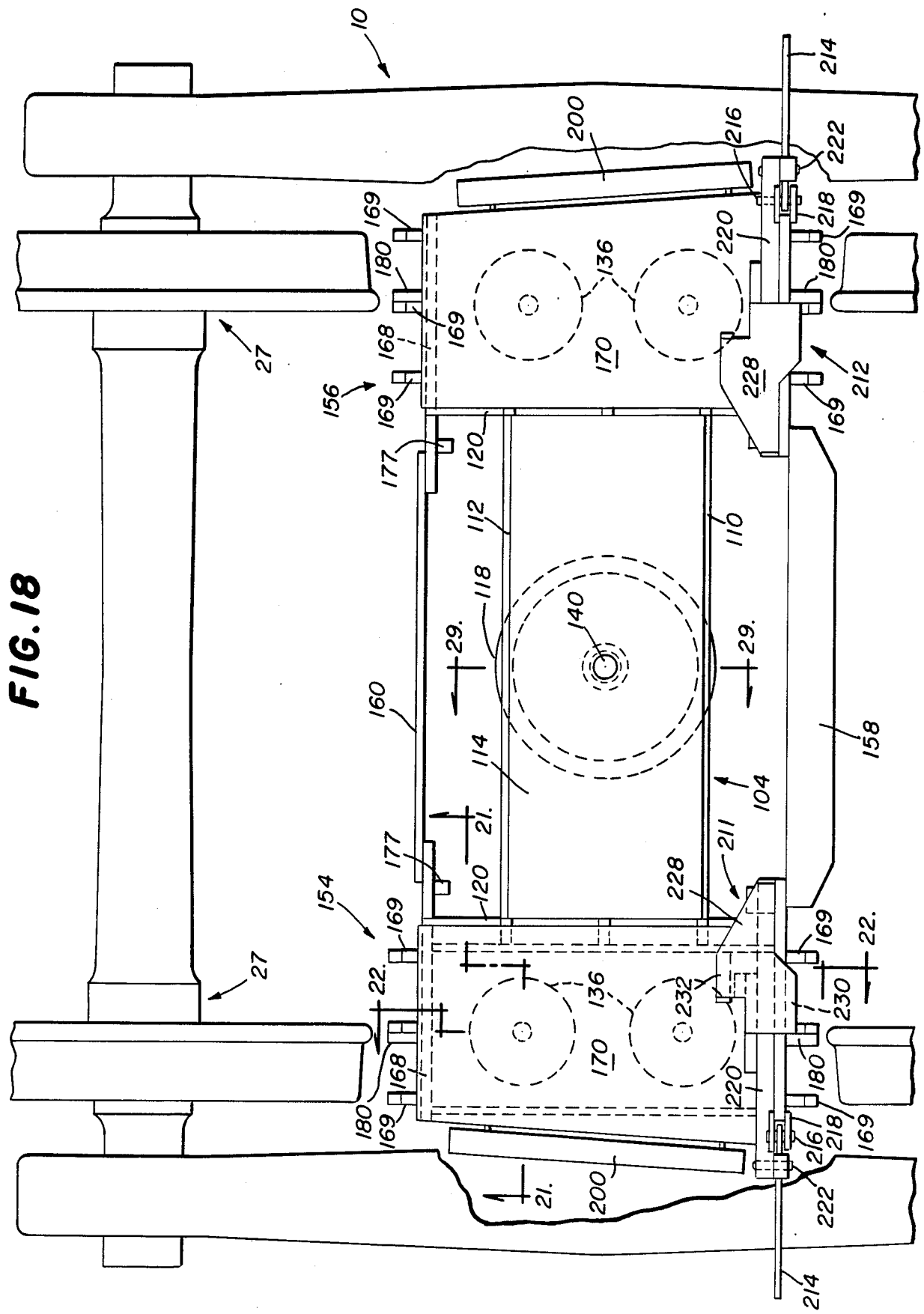
FIG. 18 is a plan view of the upper section of the adapter taken along the line 18—18 of FIG. 16.

The bottom of each portion 106,108 rests on top of, and is supported by, an adjacent side bearing 69 when the bearing boss 118 is in operable position in bowl 68. A vertical pin 140 is located in the center of central portion 104 and the center of bearing boss 118 (FIGS. 18, 29 and 30). The pin 140 has a threaded axial hole in its upper end in which threaded screw 141 is rotatably located. A collar 142 is mounted on screw 141 beneath plate 114. The upper end of screw 141 is provided with a square or hexagonal end 143 so that it can be rotated by a hand wrench to lift the entire adapter 100 upwardly off the bearing boss 118 and off the side bearings 69. The lower end 144 of pin 140 is secured in the bolster so that the pin cannot rotate. When so lifted the adapter can be readily rotated 180° by hand. The screw 141 is then reversed to lower the adapter so that the bearing boss 118 rests in bowl 68 and the adapter is also supported by the side bearings 69. This operation makes it unnecessary to rotate the entire truck to couple a trailer to the adapter from either end of the truck.

The adapter upper section 152 (FIGS. 16 and 18) has a pair of spaced apart end portions 154,156, which are mirror images of each other, interconnected by a pair of spaced apart parallel beams 158,160. Each end portion 154,156 has front and back walls 166,168 and a top plate 170. The walls 166,168 are provided with spaced apart vertical braces 169. Extending downwardly from the bottom of plate 170 is a stiffening plate 172. Also extending downwardly from the bottom of plate 170 is a vertical plate 174 having a horizontal plate 176 at its lower edge. Gussets 178 reinforce these plates. The horizontal plate 176 is spaced above plate 130 but together they constitute a stop means which limits compression of the elastomeric blocks or cylinders 136 to the distance between these two plates, it being understood that the elastomeric cylinders are under some initial precompression in the adapter. The bottom of plate 170 also contains stub pins 178 which fit into the top of the axial hole in elastomeric cylinders 136 to prevent them from moving horizontally.

The adapter 100 is formed by nesting the adapter upper section 152 over the adapter lower section 102, as shown in FIG. 15, with the four elastomeric cylinders positioned on stub pins 134,178. The adapter upper section 152 is then forced downwardly with respect to the adapter lower section 102 to partially compress the elastomeric cylinders 136. When the sections 102,152 are so positioned the respective pairs of end portions 106,154 and 108,156 form a pocket or chamber in which the elastomeric cylinders 136 are nested. Hooks 180 are located on the middle brace of three braces 169 on each of walls 166,168. The hooks 180 are then adjusted and secured in place so as to contact the bottom of plates 132 of the lower section 102. In this way the elastomeric cylinders 136 are held slightly compressed but are not restrained against further compression. As the load applied to the upper section 152 increases the cylinders 136 will be compressed until stop plate 176 hits plate 130. In general, these plates come together when about one-half the maximum load is applied to the adapter as is more fully explained hereinafter. Stop bars 177 are mounted on beam 160 so as to be reasonably close to plates 120 of the adapter lower section 102 so as to limit to a predetermined distance the lateral movement in both directions between the upper section 152 and the adapter lower section 102.

Each of the outer edges of plates 170 is tapered or angled inwardly with respect to the longitudinal center line of truck 10 so as to guide the adapter into position beneath the bottom of the trailer rear end (FIG. 18). A pair of similarly tapered or angled members 200 (FIGS. 16, 19 and 21) is mounted in the bottom of the trailer body. Each member 200 constitutes a long plate set at an angle and having a vertical upper portion 202 and a lower outwardly sloped lower portion 204. Gussets 206 reinforce each member 200 against deformation.

When the adapter 100 is positioned beneath a trailer as shown in FIGS. 15 and 18, the friction between plate 170 and the two spaced apart trailer bottom portions 210 which it contacts provides the frictional, and main, force holding them together. Since the trailers are connected in end-to-end arrangement as shown in FIG. 12, no draft or buff forces are applied to the adapter or truck but instead the truck is dragged along with the trailer. It is only when the train is braked that a significant differential longitudinal force is applied between the truck and trailer. That force is easily handled by the friction between the plates 170 and the bottom portions 210 of the trailer. Nevertheless, locking means is provided to positively but releasably lock the adapter to the trailer.

Each end portion 154,156 of the adapter upper section 152 is provided with locking mechanisms 210,212 which are mirror images of each other (FIGS. 15, 16, 19, 20 and 23 to 28). Each locking mechanism 211,212 includes an L-shaped handle 214 connected by pin 216 to a bracket 218 on the front of plate 166. Locking bar 220 is pivotally connected by pin 222 to handle 214. The end of bar 220 has a slot 224 in which stationary pin 226 is located. Pin 226 is secured in plate 166. Mounted on top of bar 220 is plate 228. A bar 230 is placed on the bottom of plate 228 along one edge and a bar 232 is placed on the bottom of plate 228 along the opposite edge so as to restrain horizontal movement of the locking mechanism with respect to the adapter upper section 152 and the trailer body vertical rear end 270 when in locking engagement.

The vertical rear end 270 of the trailer has two locking mechanisms 240 (FIGS. 23 to 28) which are mirror images of each other. Each locking mechanism 240 is positioned to be lockably engageable with a locking mechanism 211,212 on the adapter 100. Each locking mechanism 240 includes a vertical plate 242 positioned on the top outer rear edge of trailer body portion 210. Vertical plate 242 supports a horizontal plate 244 which extends to trailer vertical rear end 270. Vertical plate 246 is positioned lateral to plate 242 and it extends to trailer rear end 270. Plate 246 also rests on trailer bottom portion 210 and supports horizontal plate 244.

FIG. 23 illustrates the locking apparatus in unlocked position with the handle up. When in this position the truck and adapter are positioned beneath the trailer and then locked in position by moving the handle down to the position shown in FIG. 24. When in that position the locking mechanisms on the adapter and the trailer engage as shown in FIG. 28 thereby preventing the trailer from moving forwards or backward relative to the adapter and also preventing the trailer from moving upwardly from the adapter since bar 232 is partially under plate 244. The locking mechanism is unlocked by lifting the handle 214 upwardly until it is vertical. The truck and adapter can then be slid out from under the trailer after the trailer is lifted a short distance.

The cooperative action of the adapter provided with a secondary suspension and a swing motion truck will be further appreciated by the following description which has reference to specific structural features useful therein.

THE ADAPTER WITH SECONDARY SUSPENSION

The use of elastomeric cylinders 136 in the adapter 100 is preferred, and particularly two on each side above the side bearings. The elastomeric cylinders 136 function as springs. These springs transmit all of the empty car load to the truck with about 0.75 in. reserve or clearance to solid stops 176. With an empty trailer, the springs function to attenuate both vertical and lateral shock and harmonic loads originating from the rail. No auxiliary damping devices are required because (1) the elastomer springs provide some natural dissipation of energy, (2) the center of gravity of the empty trailer is low, and (3) the roll stability as a product of spring spacing and spring stiffness is high relative to the center of gravity height. The ability to operate with at least some undamped resilience substantially reduces the transmittable vibration bandwidth, thus, for example, a conventional freight car suspension with a light car can transmit up to 0.5 G at any frequency, whereas, the subject trailer can transmit only in a narrow band about its own natural frequency, which allows the laws of motion response to act and attenuate the source.

The adapter secondary suspension provides a stabilizing effect to the truck axle sets with a light or empty trailer which increases the hunting onset speed. The reason for this is rationalized by considering that part of the energy which drives the axle to hunt is the result of feedback from the body. The feedback is cushioned by the elastomeric springs which accounts for part of the benefit but the main reason is that the natural frequency of the body is reduced and becomes a lower ratio to the natural frequency of the axle oscillation, which in turn reduces the transmitted feedback. It appears with regards to hunting only, that the lateral natural frequency of the trailer body cannot be made too low.

The secondary or elastomeric springs also protect an empty trailer itself. While one purpose of the secondary springs in a fully or partially loaded trailer is to protect the equipment, the secondary suspension can be custom fitted to specific types of payload with substantial benefit. Thus, the equipment can be constructed so that the secondary or elastomeric springs operate fully in series with the railroad truck coil springs as, for example, from when the trailer is empty up to 6.5 tons of lading. Past that load the solid stops 176 can come into contact and transmit all additional load in parallel to the elastomeric springs. The effect is to produce nearly constant natural frequency at empty and maximum load, with the frequency being maximum at mid-load. With the stops 176 in solid contact, the elastomeric springs have no influence upon vibrations but exert a significant benefit with regards to track twist. Thus, the trailer can negotiate severe twist with less torsional strain produced in the trailer joints due to the fact that the solid stops 176 can unload and accommodate the irregularity through the elastomeric springs. This feature makes the trailer very supple with regards to uneven track. Total wheel unloading becomes very unlikely because the effective spring travel to unload the wheel is about twice that of a normal freight car. A stop position at 6.5 tons of lading may be considered a compromise based on a reasonable load. For rock-and-roll consideration, the elastomeric springs could be left active throughout the entire load range if (1) the lading is loaded to a low center of gravity, (2) there is no rock-and-roll track to be run over, (3) rock-and-roll track, if present, is not run at harmonic resonance speed, or (4) external damping is provided for the secondary suspension.

THE SWING MOTION RAILROAD TRUCK PRIMARY SUSPENSION

The swing motion railroad truck is advisably provided with eight outer D7 and eight inner D4 coil springs per truck in parallel with four outer wedge springs. The coil springs can be supplemented by four TecsPak bumpers (W.H. Miner Div. of Miner Enterprises, Inc., Geneva, Ill.) per truck which come into contact at 0.5 in. above the solid height of the coil springs. The purpose of the bumpers is to reduce solid spring impact loads, for instance, a typical 3.0 G acceleration would be theoretically reduced to 0.3 G. The combination of the long travel springs plus the bumper provides the softest suspension possible with standard freight car hardware. With a trailer empty or loaded up to 6.5 tons, the vertical ride performance will generally be better than any other freight car because the truck primary, and the adapter secondary, springs act in series. From 6.5 tons of lading up to full load, the vertical ride will be at least the equivalent of standard freight car equipment with D7 springs and generally better than cars equipped with any other class of coil springs, but for all loading cases the usual solid spring impacts will not occur because of the bumpers.

The swing motion railroad truck features side frames which act in pendulum fashion with interconnection by means of a transom member. The transom additionally holds the truck frames relative to each other to prevent parallelogram motion. The lateral action of this suspension in conjunction with good squaring stiffness gives the trailer superior lateral stability at any speed but especially at high speed. The soft lateral rate also greatly reduces the lateral loads transmitted. The swing motion plus coil spring deflection provides a total of 1¼ inches of movement to solid stop which simplifies alignment of the trailer to the truck during train assembly. With an empty trailer, the adapter secondary springs act in series with the truck primary springs and swing motion to soften the ride even further. The overall lateral ride quality is expected to be better than conventional freight cars at either empty or loaded condition. Current indications are that a speed rating of 85 mph can realistically be achieved. The combined effect of lateral ride quality plus speed capability are key factors in successful freight carrying competition by means of trains of trailers according to the invention.

THE SUPERIOR PERFORMANCE PROVIDED BY THE APPARATUS OF THE INVENTION

Figure 32:
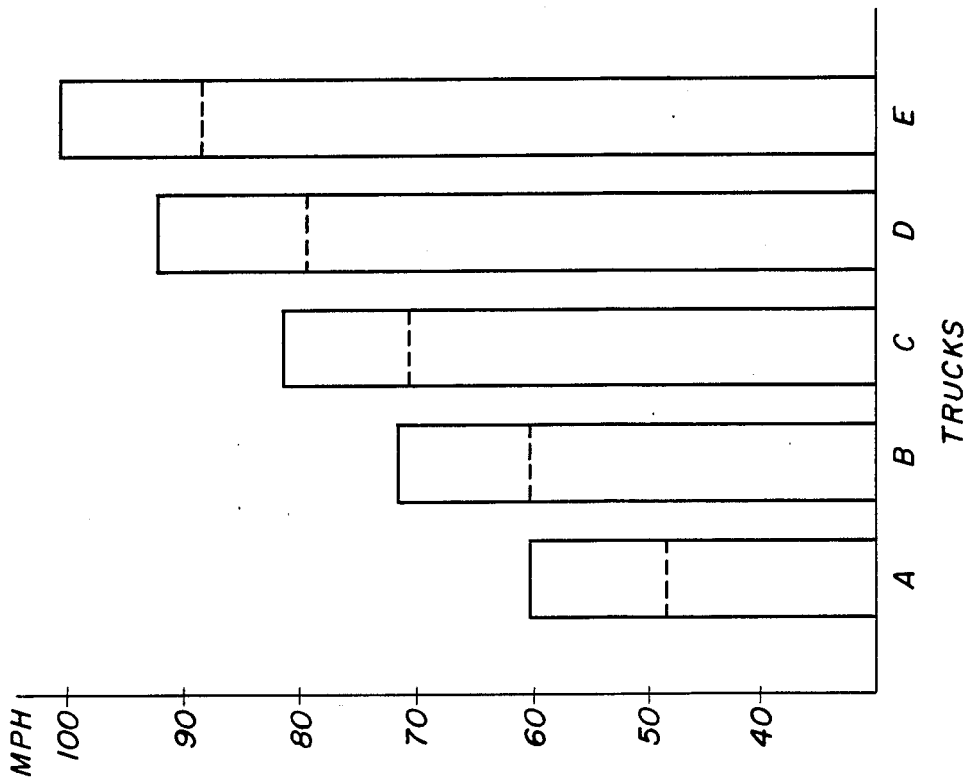
FIG. 32 is a bar graph illustrating the speed at which onset of hunting and full hunting occur based on wheel lateral forces for the same railroad car trucks identified in FIG. 31.
Figure 31:
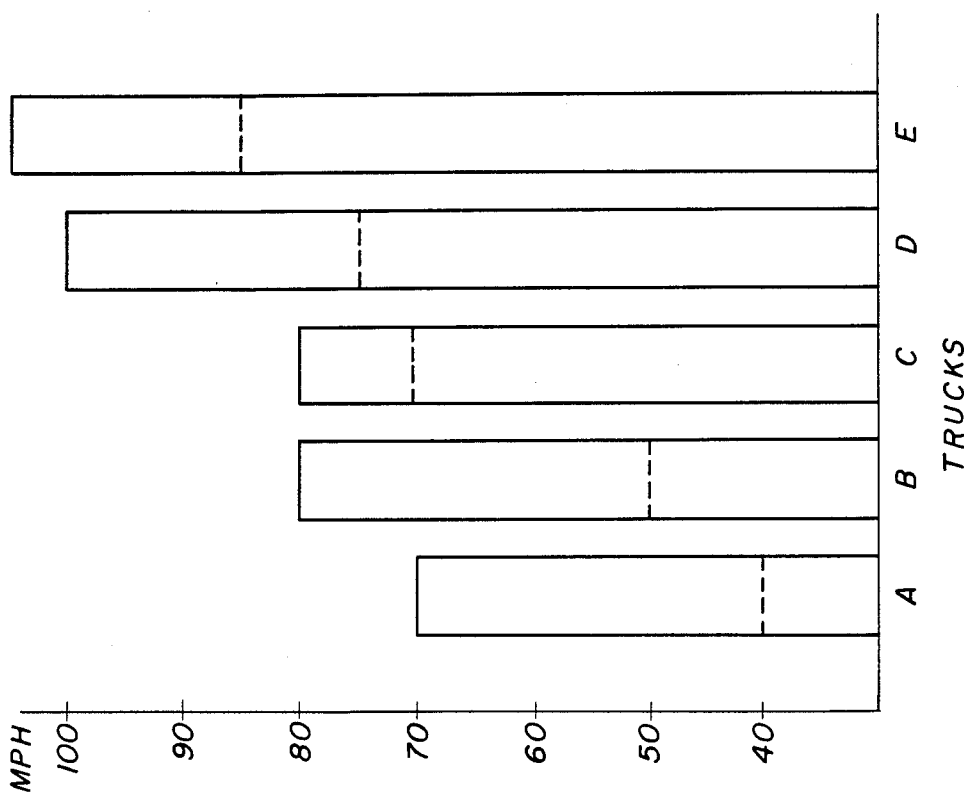
FIG. 31 is a bar graph illustrating the speed at which onset of hunting and full hunting occur as measured by trailer body acceleration determined above the truck for different railroad car trucks.

FIGS. 31 and 32 illustrate the superior performance provided by a train of trailers equipped with the swing motion truck and an adapter according to the inventor.

FIG. 31 illustrates the speeds at which onset of hunting (dashed line), and full hunting (top of columns), are expected to occur based on a computer model study using for analysis five railroad trucks identified as follows:
- A. National CI standard three-piece freight truck.
- B. ASF RideMaster truck if it were to be equipped with a frame brace marketed by Standard Car Truck Co.
- C. Same as B except that roller devices were included between the trailer body and truck to isolate the trailer body from lateral rail dynamic loads.
- D. National Castings swing motion truck as described in Weber et al U.S. Pat. No. 3,670,660.
- E. Same as D except that the adapter of the invention was provided with four elastomeric cylinders, i.e. rubber with composite fabric reinforcement, which functions as a nonlinear spring. The cylinders are marketed by Firestone Industrial Products under the name MARSHMELLOW.

Onset of hunting describes the speed at which lateral oscillation of the axles or trailer body begins to experience an increase in hunting activity. Activity will continually increase with speed past the onset until cycle limits are reached. Full hunting refers to the hunting oscillation after upper cycle limits are reached. Cycle limits are determined by flange clearance for the wheels or energy equilibrium for the trailer body. The trailer possesses destructive power during upper limit activity. FIG. 31 compares hunting based on trailer body acceleration as a ratio to gravity as measured in the trailer body directly above the truck. It quantifies the body motion potential to produce fatigue and wear of trailer components.

The graph of FIG. 31 shows that D gives better performance than A, B and C. Also, the graph shows that the addition of the elastomeric springs (E) enhances the performance regarding hunting activity. Also, the peak acceleration level for A is 2.1 G (70 mph) and that is reduced to 0.4 G for D (100 mph) and to 0.2 G for E at 100 mph.

FIG. 32 illustrates the speed at which onset of hunting (dashed line), and full hunting (top of columns), are expected to occur as measured as the L/V ratio of flange force against the rail divided by the weight on the wheel pressing it against the rail. L/V is a railroad term related to safety because derailment occurs when the ratio becomes excessive. The trucks A, B and C had ratios above 1.6, truck D had a ratio of about 1.25 and truck E a ratio of about 0.25 at 90 mph.

The foregoing detailed description has been given for clearness of understanding only, and no unnecessary limitations should be understood therefrom, as modifications will be obvious to those skilled in the art.

What is claimed is:

1. A railroad train comprising:
   a plurality of highway trailers positioned front end to rear end;
   each highway trailer having highway engaging wheels near the rear end supported above a railroad track;
   means on ach trailer to selectively raise the highway engaging wheels to an inoperative position for travel on a railrod track and to lower the wheels into highway engaging operative position for traveling on a highway;
   a separate railroad track engaging railroad truck positioned to releasably support the rear end of each trailer;
   a first coupling means substantially permanently connected to the trailer rear end;
   a second coupling means substantially permanently connected to the truck;
   means to quickly connect the first coupling means to, and quickly disconnect the first coupling means from, the second coupling means whereby when so connected the second coupling means and the truck can rotate relative to each other about a vertical axis;
   hitch means to releasably hitch the rear end of one trailer to the front end of an adjoining trailer to form a train of a plurality of such hitched together and truck supported trailers;
   the trucks supporting at least many of the trailers in the train being four-wheel two-axile swing motion trucks which control lateral roll oscillations of the truck-supported trailer and hunting of the truck;
   the second coupling means constituting an adapter;
   the truck having a lateral bolster;
   the adapter being mounted on, and longitudinal to, the bolster; the adapter being supported by side bearings mounted on the bolster;
   the adpater having longitudinally spaced apart upper surfaces which contact mating surfaces on, and support, the trailer;
   the bolster having a center plate bowl and the adapter having a bearing boss which is rotatable in the bolster center plate bowl;
   the adapter having complementary lower and upper sections which are interconnected but vertically movable with respect to each other for a predetermined distance; and
   resilient compressible means located between the adapter lower and upper sections above the bolster side bearings, with said resilient compressible means being vertically compressible upon application of an increased load by rocking of the trailer.

2. A railroad train according to claim 1 in which the resilient compressible means is a spring means.

3. A railroad train according to claim 1 in which the resilient compresible means is an elastomeric means.

4. A railroad train according to claim 3 in which the elastomeric means is in the form of blocks.

5. A railroad train according to claim 2 in which:
   the adapter has a pocket above each of the bolster side bearings and the spring means is located in the pockets.

6. A railroad train according to claim 5 in which the spring means is in the form of elastomeric blocks.

7. A railroad train according to claim 1 in which:
   the adapter lower and upper sections are restricted against significant horizontal movement relative to each other.

8. A railroad train according to claim 7 in which:
   the upper seection has guide means for guiding the adapter into coupling arrangement with the first coupling mans connected to the trailer rear end.

9. A railroad train according to claim 8 in which:
   the first coupling means includes guide means on the trailer body which cooperates with the guide means on the adapter to position the adapter in coupling arrangement with the trailer bottom; and
   the adapter includes locking mens for releasably locking the adapter to the trailer.

10. A railroad train comprising:
    a plurality of highway trailers positioned front end to rear end;
    each highway trailer having highway engaging wheels near the rear end supported above a railroad track;
    means on each trailer to selctively raise the highway engaging wheels to an inoperative position for travel on a railroad track and to lower the wheels into highway engaging operative position for travel on a highway;
    a separate railroad track engaging railroad truck positioned to releasably support the rear end of each trailer;
    a first coupling means substantially permanently connected to the trailer rear end;
    a second coupling means substantially permanently connected to the truck;
    the second coupling means constituting an adapter;
    the truck having a lateral bolster with a center plate bowl;
    the adapter being mounted on and longitudinal to the boltster;
    the adapter having a bearing boss which is rotatable in the bolster center plate bowl;
    the adapter being supported by side bearings mounted on the bolster;
    the adapter having longitudinally spaced apart upper surfaces which contact mating surfaces on, and support, the trailer;
    the adapter having complemntary lower and upper sections which are interconnected but vertically movable with respect to each other for a predetermined distance;
    resilient compressible means being located between the adpater lower and upper sections above the bolster side bearings, with said resilient compressible means being vertically compressible upon application of an increased load by rocking of the trailer;
    means to quickly connect the first coupling means to, and quickly disconnect the first coupling means from, the adapter whereby when so connected the adapter and the truck can rotate relative to each other about a vertical axis; and hitch means to releasably hitch the rear end of one trailer to the front end of an adjoining trailer to form a train of a plurality of such hitched together and truck supported trailers.

11. A railroad train according to claim 10 in which the resilient compressible means is a spring means.

12. A railroad train according to claim 10 in which the resilient compressible means is an elastomeric means.

13. A railroad train according to claim 12 in which the elastomeric means is in the form of blocks.

14. A railroad train according to claim 11 in which:
the adapter has a pocket above each of the bolster side bearings and the spring means is located in the pockets.

15. A railroad train according to claim 14 in which the spring means is in the form of elastomeric blocks.

16. A railroad train according to claim 10 in which:
the adapter lower and upper sections are restricted against significant horizontal movement relative to each other.

17. A railroad train according to claim 16 in which:
the upper section has guide means for guiding the adapter into coupling arrangement with the first coupling means connected to the trailer rear end.

18. A railroad train according to claim 17 in which:
the first coupling means includes guide means on the trailer body which cooperates with the guide means on the adapter to position the adapter in coupling arrangement with the trailer bottom; and
the adapter includes locking means for releasably locking the adapter to the trailer.

19. An adapter to be mounted on a bolster of a railroad truck to support the rear end of a trailer in a train of trailers;
the adapter having logitudinally spaced apart upper surfaces which can contact mating surfaces on, and support, a trailer;
the adapter having a bearing boss which is rotatable in a truck bolster center plate bowl;
the adapter having complementary lower and upper sections which are interconnected but vertically movable with respect to each other for a predetermined distance; and
resilient compressible means being located between end portions of the adapter lower and upper sections, with said resilient compressible means being vertically compressible upon application of an increased load by rocking of the trailer.

20. An adapter according to claim 19 in which the resilient compressible means is a spring means.

21. An adapter according to claim 19 in which the resilient compressible means is an elastomeric means.

22. An adapter according to claim 19 in which the elastomeric means is in the form of blocks.

23. An adapter according to claim 20 in which the adapter has a pocket positioned to be above bolster side bearings and the spring means is located in the pockets.

24. An adapter according to claim 23 in which the spring means is in the form of elastomeric blocks.

25. An adapter according to claim 19 in which the adapter lower and upper sections have means which restricts significant horizontal movement relative to each other.

26. A railroad train comprising:
a plurality of highway trailers positioned front end to rear end;
each highway trailer having a highway engaging wheels near the rear end supported above a railroad track;
means on each trailer to selectively raise the highway engaging wheels to an inoperative position for travel on a railroad track and to lower the wheels into highway engaging operative position for travel on a highway;
a separate railroad track engaging railroad truck positioned to releasably support the rear end of each trailer;
a first coupling means substantially permanently connected to the trailer rear end;
a second coupling means substantially permanently connected to the truck;
means to quickly connect the first coupling means to, and quickly disconnect the first coupling means from, the second coupling means whereby when so connected the second coupling means and the truck can rotate relative to each other about a vertical axis;
hitch means to releasably hitch the rear end of one trailer to the front end of an adjoining trailer to form a train of a plurality of such hitch together and truck supported trailers;
the trucks supporting at least many of the trailers in the train being four-wheel two-axle swing motion trucks which control lateral roll oscillations of the truck-supported trailer and hunting of the truck;
the truck comprising a pair of side frames rockably journaled on associated wheel and axle assemblies for lateral swinging movement under the action of laterally directed forces applied to the truck, each frame comprising a tension member having a base portion and a pair of vertical columns extending upwardly from the base portion and spaced in the lengthwise direction of the frame to define a bolster opening, a spring plank extending between said frames with each end of said plank being received in said opening of the adjacent frame, rocker means between each end of said plank and said base portion of each frame for supporting said plank for rocking movement in a dirction laterally of said frames, means interconnecting the ends of said plank and said frames to interlock said frames to the plank, a bolster extending between said frames and supported at its ends within the bolster opening of the adjacent frame, spring means on said plank within each opening for supporting said bolster end first stop means on said bolster and plank adapted to engage upon a predetermined amount of lateral swinging movement of said frames and transverse deflection of said spring means to limit the lateral movement of said bolster relative to said frames, said stop means engaging at a point below the plane containing the axes of the axles and a friction shoe interposed between and resliently urged into engagement with a side of said bolster and the opposing one of said columns for frictionally resisting movement of said bolster; second stop means associated with each end of the spring plank and engageable with stop means on said base portion of the side frames for limiting said predetermined amount of swinging movement of the side frames in either direction from the central longitudinal vertical plane of the side frame prior to the engagement of said first stop means;

the second coupling means consituting an adapter;

the truck having a lateral bolster;

the adapter being mounted on, and longitudinal to, the bolster;

the adapter being supported by side bearings mounted on the bolster;

the adapter having surface means which contacts mating surfaces on, and which support, the trailer;

the bolster having a center plate bowl and the adapter having a bearing boss which is rotatable in the bolster center plate bowl;

the adapter having complemnetary lower and upper sections which are interconnected but vertically movable with respect to each other for a predetermined distance; and resilient compressible means located between the adapter lower and upper sections above the bolster side bearings, with said resilient compressible means being vertically compressible upon application of an increased load by rocking of the trailer.

27. A railroad train according to claim 26 in which the resilient compressible means is a spring means.

28. A railroad train according to claim 26 in which the resilient compressible means is an elastomeric means.

29. A railroad train according ot claim 28 in which the elastomeric means is in the form of blocks.

30. A railroad train according to claim 27 in which:
the adapter has a pocket above each of the bolster side bearings and the spring means is located in the pockets.

31. A railroad train according to claim 30 in which the spring means is in the form of elastomeric blocks.

32. A railroad train according to claim 26 in which:
the adapter lower and upper sections are restricted against significant horizontal movement relative to each other.

33. A railroad train according to claim 32 in which:
the upper section has guide means for guiding the adapter into coupling arrangement with the first coupling means connected to the trailer rear end.

34. A railroad train according to claim 33 in which:
the first coupling means includes guide means on the trailer body which cooperates with the guide means on the adapter to position the adapter in coupling arrangement with the trailer bottom; and
the adapter includes locking means for releasably locking the adapter to the trailer.

35. A railroad rain comprising:
a plurality of highway trailers positioned front end to rear end;
each highway trailer having highway engaging wheels near the rear end supported above a railroad track;
means on each trailer to selectively raise the highway engaging wheels to an inoperative position for travel on a railroad track and to lower the wheels into highway engaging operative position for travel on a highway;
a separate railroad track engaging railroad truck positioned to releasably support the rear end of each trailer;
a first coupling means substantially permanently connected to the trailer rear end;
a second coupling means substantially permanently connected to the truck;
the second coupling means constituting an adapter;
the truck having a lateral bolster with a center plate bowl;
the adapter being mounted on and longitudinal to the bolster;
the adapter having a bearing boss which is rotatable in the bolster center plate bowl;
the adapter being supported by side bearings mounted on the bolster;
the adapter having surface means which contacts mating surfaces on, and supports, the trailer;
the adapter having complementary lower and upper sections which are interconnected but vertically movable with respect to each other for a predetermined distance;
resilient compressible means being located between the adapter lower and upper sections above the bolster side bearings, with said resilient compressible means being vertically compressible upon application of an increased load by rocking of the trailer;
means to quickly connect the first coupling means to, and quickly disconnect the first coupling means from, the adapter whereby when so connected the adapter and the truck can rotate relative to each other about a vertical axis; and
hitch means to releasably hitch the rear end of one trailer to the front end of an adjoining trailer to form a train of a plurality of such hitched together and truck supported trailers.

36. An adapter to be mounted on a bolster of a railroad truck to support the rear end of a trailer in a train of trailers;
the adapter having upper surface means which can supportably contact mating surfaces on a trailer;
the adapter having a bearing boss which is rotatable in a truck bolster center plate bowl;
the adapter having complementary lower and upper sections which are interconnected but vertically movable with respect to each other for a predetermined distance; and
resilient compressible means being located between end portions of the adapter lower and upper sections, with said resilient compresible means being vertically compressible upon application of an increased load by rocking of the trailer.

37. An adapter according to claim 36 in which the resilient compressible means is a spring means.

38. An adapter according to claim 36 in which the resilient compressible means is an elastomeric means.

39. An adapter according to claim 36 in which the elastomeric means is in the form of blocks.

40. An adapter according to claim 37 in which the adapter has a pocket positioned to be above bolster side bearings and the spring means is located in the pockets.

41. An adapter according to claim 40 in which the spring means is in the form of elastomeric blocks.

42. An adapter according to claim 36 in which the adapter lower and upper sections have means which restricts significant horizontal movement relative to each other.

* * * * *

UNITED STATES PATENT AND TRADEMARK OFFICE
CERTIFICATE OF CORRECTION

PATENT NO. : 4,773,335

DATED : September 27, 1988

INVENTOR(S) : Sam D. Smith and Richard D. Curtis

It is certified that error appears in the above-identified patent and that said Letters Patent is hereby corrected as shown below:

Column 9, line 45, change "side" to --the--;

Column 6, line 41, change "2,717,588" to --2,717,558--;

Column 7, line 48, change "are" to --is--;

Column 14, line 27, change "inventor." to --invention.--;

Column 15, line 21, change "ach" to --each--;

Column 15, line 44, change "axile" to --axle--;

Column 15, line 50, start a new paragraph with "the adapter";

Column 16, line 18, change "mans" to --means--;

Column 16, line 24, change "mens" to --means--;

Column 16, line 56, change "complemntary" to --complementary--;

Column 18, line 3, delete "a";

Page 1 of 2 Pages.

UNITED STATES PATENT AND TRADEMARK OFFICE
CERTIFICATE OF CORRECTION

PATENT NO. : 4,773,335

DATED : September 27, 1988

INVENTOR(S) : Sam D. Smith and Richard D. Curtis

It is certified that error appears in the above-identified patent and that said Letters Patent is hereby corrected as shown below:

Column 18, line 26, change "hitch" to --hitched--;

Column 18, line 45, change "dirction" to --direction--;

Column 19, line 14, change "complemnetary" to --complementary--; and

Column 19, line 53, change "rain" to --train--.

Page 2 of 2 Pages.

Signed and Sealed this

Twenty-first Day of February, 1989

Attest:

DONALD J. QUIGG

*Attesting Officer*  *Commissioner of Patents and Trademarks*